US008998698B2

(12) United States Patent
Kishi

(10) Patent No.: US 8,998,698 B2
(45) **Date of Patent: *Apr. 7, 2015**

(54) DETECTION DEVICE CAPABLE OF ACCURATELY READING DOTS ON DICE

(71) Applicant: Aruze Gaming America, Inc., Las Vegas, NV (US)

(72) Inventor: Hideaki Kishi, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,381

(22) Filed: Feb. 12, 2014

(65) Prior Publication Data

US 2014/0159308 A1 Jun. 12, 2014

Related U.S. Application Data

(63) Continuation of application No. 13/494,617, filed on Jun. 12, 2012, now Pat. No. 8,684,812, which is a continuation of application No. 12/609,397, filed on Oct. 30, 2009, now Pat. No. 8,216,067.

(60) Provisional application No. 61/114,824, filed on Nov. 14, 2008, provisional application No. 61/114,870, filed on Nov. 14, 2008.

(51) Int. Cl.

| | |
|---|---|
| ***G07F 17/32*** | (2006.01) |
| ***A63F 13/10*** | (2006.01) |
| ***A63F 9/04*** | (2006.01) |
| *A63F 7/26* | (2006.01) |
| *A63F 9/24* | (2006.01) |

(52) U.S. Cl.

CPC ................. *A63F 9/0468* (2013.01); *A63F 7/26* (2013.01); *A63F 9/0402* (2013.01); *A63F 2009/2429* (2013.01); *A63F 2009/2489* (2013.01); *G07F 17/3202* (2013.01); *G07F 17/3206* (2013.01); *G07F 17/3213* (2013.01)

(58) Field of Classification Search

USPC ................................................ 463/16, 17, 31

See application file for complete search history.

(56) References Cited

U.S. PATENT DOCUMENTS

| | | | | |
|---|---|---|---|---|
| 5,413,351 | A | 5/1995 | Franklin | |
| 7,017,905 | B2 | 3/2006 | Lindsey | |
| 7,857,310 | B2 | 12/2010 | Yoshizawa | |
| 2006/0054679 | A1 * | 3/2006 | Ruping | 235/375 |
| 2007/0026947 | A1 | 2/2007 | Chun | |
| 2008/0093798 | A1 * | 4/2008 | Yoshizawa | 273/146 |
| 2011/0165948 | A1 * | 7/2011 | Sasaki et al. | 463/46 |
| 2012/0225714 | A1 * | 9/2012 | Kido | 463/29 |

FOREIGN PATENT DOCUMENTS

WO 2007/016776 2/2007

* cited by examiner

*Primary Examiner* — Pierre E Elisca

(74) *Attorney, Agent, or Firm* — Lexyoume IP Meister, PLLC

(57) ABSTRACT

A detection device is used in a gaming machine that detects numbers of dots on a plurality of dice having wireless tags. The detection device reads the wireless tags which are embedded on each face of the dice by a reader having an antenna. The antenna of the reader includes a first antenna portion disposed substantially in a central portion of a field that supports the dice, and formed in a substantially circular shape, and a plurality of second antenna portions disposed so as to superimpose a detection area of the first antenna portion, and having a detection area larger than the first antenna portion. The first antenna portion and the plurality of the second antenna portions are disposed so as to have a portion of detection areas mutually superimposed on a playing board.

20 Claims, 23 Drawing Sheets

DETECTION DEVICE CAPABLE OF ACCURATELY READING DOTS ON DICE

CROSS REFERENCE TO RELATED APPLICATIONS

This application is a Continuation of U.S. Non-Provisional application Ser. No. 13/494,617 filed on Jun. 12, 2012, which is a Continuation of U.S. Non-Provisional application Ser. No. 12/609,397 filed on Oct. 30, 2009, which claims priority from U.S. Provisional Application No. 61/114,824, filed Nov. 14, 2008, and 61/114,870, filed Nov. 14, 2008, the entire contents of which are incorporated herein by reference.

BACKGROUND OF THE INVENTION

1. Field of the Invention

The present invention relates to a detection device that detects a number of dots on dice in a gaming machine providing a dice game.

2. Related Art

Conventionally, various table games are well known and, for example, among table games, there exists a game genre of so-called dice games, as disclosed in WO 07/016776, U.S. Patent Application Publication No. 2007/0026947, and U.S. Pat. No. 5,413,351.

Among dice games, for example, as disclosed in U.S. Pat. No. 5,413,351, a game method is disclosed in which, upon a player placing a bet, a dealer throws dice and, in a case where a result thereof becomes a predetermined combination, the player is entitled to throw the dice, and has a chance to win a payout of a large amount. In addition, Sic Bo is known as an old and familiar dice game in Asia in which a player places a bet on predicted numbers of dots appearing on three thrown dice.

Sic Bo is well known as a dice game of ancient China, and is a dice game in which a player places a bet on predicted numbers of dots or a combination thereof appearing on three thrown dice. With such a dice game, a result of the bet is judged based on numbers of dots on dice, which come to rest after a plurality of dice are thrown.

In a case of a dice game performed by a plurality of players, a result of the bet can be judged by participants visually confirming the numbers of dots on the dice thrown. However, as the size of a game increases and thus the number of participants increases, it becomes difficult for each participant to visually confirm the number of dots on dice.

Meanwhile, when providing a game by virtualizing dice in a dice game and executing the game on a network or a computer, it may degrade a live aspect in which dice roll and come to rest or rendered effects for chances, rather than a game played by actually throwing dice.

On the other hand, in a case of actually throwing dice and showing that dice roll, it is necessary to read a number of dots on dice steadily, quickly, accurately, and constantly. In a case in which the number of dots on dice can not be read accurately, it may affect advancement of a game. It may also reduce the motivation of a player toward a game if a situation in which the number of dots on dice can not be accurately read continues. Therefore, it is necessary to avoid the situation in which the number of dots on dice can not be accurately read.

Thus, it is an object of the present invention to provide a detection device that can detect a number of dots on dice accurately in a gaming machine that provides a dice game in which dice are actually thrown.

Furthermore, in a case of performing a game by actually throwing a die in a dice game, it is necessary to roll the die.

More specifically, in a SIC BO game, a plurality of dice is caused to roll, and as a result of which a bet result that has been placed on is judged. Therefore, causing the dice to roll itself is an important rendered effect of the game. In order to make die rolling be visually recognizable to multiple players, it is necessary to show movement of the die in as large a scale as possible to be recognizable by the players, for example, such as to show the die bouncing many times. Accordingly, in a case of causing the die to roll by oscillating a field supporting the die, it is necessary to move the field itself enough to be visually recognizable to the players. In such a situation, however, there rises a problem in that it tends to cause deterioration and damage to a member connecting between a moving part and a detection device main body due to the motion of the moving part.

Thus, it is an object of the present invention to provide a detection device that can prevent deterioration and damage due to the moving part motion and can detect a number of dots on a die accurately in a gaming machine that provides a dice game in which the die is actually thrown.

SUMMARY OF THE INVENTION

According to a first aspect of the present invention, a detection device, which is used in a gaming machine that detects a number of dots on a die, that reads the number of dots on the die, the device comprising: a wireless tag that is disposed in the die; and a reader that reads number of dots information from the wireless tag, wherein the reader includes a plurality of antenna portions that is disposed on a field on which the die rolls, and forms a plurality of detection areas, and wherein the plurality of the antenna portions is disposed so that the detection areas formed by each of the plurality of antenna portions are partially mutually superimposed.

According to a second aspect of the present invention, a detection device, which is used in a gaming machine that detects a number of dots on a die having a wireless tag, and reads the number of dots on the die, includes: a field that supports the die; and a reader that reads number of dots information of the dice from the wireless tag, in which the reader includes: a reader main body portion that decodes the number of dots information from the wireless tag and controls the reader; a first antenna portion disposed substantially in a central portion of the field, and formed in a substantially circular shape; a plurality of second antenna portions disposed so as to superimpose a detection area of the first antenna portion, and having a detection area larger than the first antenna portion; and wiring that respectively connects the first antenna portion and the second antenna portion to the reader main body portion, and in which the plurality of the second antenna portions are disposed so as to have a portion of detection areas mutually superimposed.

According to the second aspect of the present invention, the detection device according to the present invention is used in a gaming machine that detects a number of dots on a die having a wireless tag, and reads the number of dots on the die, and has a first antenna portion disposed substantially in a central portion of the field, and formed in a substantially circular shape and a plurality of second antenna portions disposed so as to superimpose a detection area of the first antenna portion, and having a detection area larger than the first antenna portion. The first antenna portion and the second antenna portion are respectively connected to the reader main body portion, and the plurality of the second antenna portions are disposed so as to have a portion of detection areas mutually superimposed.

Thus, on the field, the first antenna portion and the plurality of the second antenna portions are disposed so as to have a portion of detection areas mutually superimposed. Therefore, the wireless tags on the dice can be detected even if the dice are located at the center or a peripheral portion of the field.

According to a third aspect of the present invention, along with the detection device according to the second aspect, the plurality of the second antenna portions are formed so as to substantially depict a cross shape, and to have a width of each end portion thereof formed so as to be larger than a width of a central portion of the second antenna portion.

According to the third aspect of the present invention, along with the detection device according to the second aspect, the plurality of the second antenna portions is formed so as to substantially depict a cross shape, and to have a width of each end portion thereof formed so as to be larger than a width of a central portion of the second antenna portion. Therefore, regarding the detection area in which the wireless tag is detected, the first antenna portion can detect the wireless tag mainly at the central portion and the second antenna portion can detect the wireless tag at the peripheral portion of the field.

According to a fourth aspect of the present invention, along with the detection device according to the second aspect, a quantity of the second antenna portions is two, the second antenna portion is formed so as to substantially depict a cross shape in which a width of each end portion thereof is formed so as to be larger than a width of a central portion of the second antenna portion, and areas of side portions thereof are disposed so as to be mutually superimposed.

According to the fourth aspect of the present invention, along with the detection device according to the second aspect, a quantity of the second antenna portions is two. Then, the second antenna portion is formed so as to substantially depict a cross shape in which a width of each end portion thereof is formed so as to be larger than a width of a central portion of the second antenna portion, and areas of side portions thereof are disposed so as to be mutually superimposed.

Thus, since three antenna portions along with the first antenna portion are provided, the entire field can be detected. Furthermore, areas of side portions of the second antenna portions are disposed so as to be mutually superimposed. Since the antenna line becomes the limiting line of a communication area, it becomes difficult to detect the wireless tag. However, since the areas of the second antenna portions are disposed so as to be mutually superimposed, the two antenna lines are not disposed on an identical line. Therefore, even in a case in which a die comes to rest on one antenna line of the second antenna, the wireless tag of the die can be detected by the other second antenna.

According to a fifth aspect of the present invention, along with the detection device according to the second aspect, the reader main body performs switching of detection of the wireless tag by the first antenna portion and the plurality of the second antenna portions in a predetermined order.

According to the fifth aspect of the present invention, along with the detection device according to the second aspect, switching of detection of the wireless tag by the first antenna portion and the plurality of the second antenna portions is performed in a predetermined order. Thus, it is possible to prevent interference caused by simultaneous detection and to detect the wireless tag accurately.

According to a sixth aspect of the present invention, along with the detection device according to the second aspect, the wireless tag is disposed on each face of the die.

According to the sixth aspect of the present invention, along with the detection device according to the second aspect, the wireless tag is disposed on each face of the die. Thus, since the first antenna portion and a plurality of the second antennas can read information of the wireless tag on each face of the dice, it is possible to detect numbers of dots on the die accurately.

According to a seventh aspect of the present invention, a detection device, which is used in a gaming machine that detects a number of dots on a die having a wireless tag, and reads the number of dots on the die, includes: a field that supports the die; and a reader that reads a number of dots information of the die from the wireless tag, in which the reader includes: a reader main body portion that decodes the number of dots information from the wireless tag and controls the reader, and a plurality of antenna portions that are connected to the reader main body portion, in which a detection area respectively formed by the plurality of the antenna portions is at least one portion on the field, and in which the detection area respectively formed by the plurality of the antenna portions is disposed so as to have at least one portion mutually superimposed.

According to the seventh aspect of the present invention, the detection device is used in a gaming machine that detects a number of dots on a die having a wireless tag, and reads the number of dots on the die, and includes a field that supports the die and a reader that reads a number of dots information of the die from the wireless tag. Then, the reader includes a reader main body portion that controls the reader and a plurality of antenna portions that are connected to the reader main body portion. A detection area respectively formed by this plurality of the antenna portions is at least one portion on the field, and the detection area respectively formed by the plurality of the antenna portions is disposed so as to have at least one portion mutually superimposed.

Thus, even if a single antenna cannot detect the wireless tag, another antenna can detect the wireless tag. Accordingly, it is possible to detect the wireless tag that the die has regardless of is the location of the die on the field.

According to a eighth aspect of the present invention, along with the detection device according to the seventh aspect, the plurality of the antenna portions include: a first antenna portion disposed substantially in a central portion of the field, and formed in a substantially circular shape; a plurality of second antenna portions disposed so as to superimpose a detection area of the first antenna portion, and having a detection area larger than the first antenna portion; and wiring that respectively connects the first antenna portion and the second antenna portion to the reader main body portion, in which the plurality of the second antenna portions are disposed so as to have a portion of a detection area thereof mutually superimposed.

According to the eighth aspect of the present invention, along with the detection device according to the seventh aspect, the plurality of the antenna portions include a first antenna portion disposed substantially in a central portion of the field, and formed in a substantially circular shape and a plurality of second antenna portions disposed so as to superimpose a detection area of the first antenna portion, and having a detection area larger than the first antenna portion. Furthermore, the first antenna portion and the second antenna portion are connected respectively to the reader main body portion by way of wiring. In addition, the plurality of the second antenna portions is disposed so as to have a portion of a detection area thereof mutually superimposed.

Thus, even if a single antenna cannot detect the wireless tag, another antenna can detect the wireless tag. Accordingly, it is possible to detect the wireless tag that the die has regardless of the location of the die on the field.

According to an ninth aspect of the present invention, along with the detection device according to the seventh aspect, the plurality of the antenna portions is formed in a shape enclosed by one arc, two lines respectively indicating a radius passing through both ends of the one arc, and a line shorter than the one arc and concentric with the one arc, in which the plurality of the antenna portions respectively have an angle of an inside corner, which is formed by intersecting two lines respectively indicating the radius on an extended straight line, of no greater than 180 degrees, and in which areas in a vicinity of the line indicating the radius of the plurality of the antenna portions are disposed so as to be mutually superimposed.

According to the ninth aspect of the present invention, along with the detection device according to the seventh aspect, the plurality of the antenna portions is formed in a shape enclosed by one arc, two lines respectively indicating a radius passing through both ends of the one arc, and a line shorter than the one arc and concentric with the one arc. Furthermore, the plurality of the antenna portions respectively have an angle of an inside corner, which is formed by intersecting two lines respectively indicating the radius on an extended straight line, of no greater than 180 degrees. Then, areas in a vicinity of the line indicating the radius of the plurality of the antenna portions are disposed so as to be mutually superimposed.

Thus, even if a single antenna cannot detect the wireless tag, another antenna can detect the wireless tag. Accordingly, it is possible to detect the wireless tag that the die has regardless of the location of the die on the field.

According to a tenth aspect of the present invention, along with the detection device according to the seventh aspect, the plurality of the antenna portions respectively include a plurality of first antenna lines disposed in parallel along a first direction and a plurality of second antenna lines disposed in parallel along a second direction that perpendicularly intersects the first direction, and each of the plurality of the antenna portions is disposed at a position to be mutually displaced in a predetermined direction.

According to the tenth aspect of the present invention, along with the detection device according to the seventh aspect, the plurality of the antenna portions respectively include a plurality of first antenna lines disposed in parallel along a first direction and a plurality of second antenna lines disposed in parallel along a second direction that perpendicularly intersects the first direction. Each of a plurality of antennas is formed in a so-called grid pattern. Then, each of a plurality of antennas is disposed to be dislocated in a predetermined direction. Thus, since the detection areas are mutually superimposed on the field, even if a single antenna cannot detect the wireless tag, another antenna can detect the wireless tag. Accordingly, it is possible to detect the wireless tag that the die has regardless of the location of the die on the field.

According to a eleventh aspect of the present invention, along with the detection device according to the seventh aspect, the plurality of the antenna portions includes: a first antenna portion disposed substantially in a central portion of the field, and formed in a substantially circular shape, and a plurality of second antenna portions that form a shape enclosed by one arc, two lines respectively indicating a radius passing through both ends of the one arc, and a line shorter than the one arc and concentric with the one arc, in which the second antenna portion includes an angle of an inner corner, which is formed by intersecting the two lines respectively indicating the radius on an extended straight line, of at least 180 degrees, and in which areas in a vicinity of the lines respectively indicating the radius of the plurality of the antenna portions are disposed so as to be mutually superimposed.

According to the eleventh aspect of the present invention, along with the detection device according to the seventh aspect, the plurality of the antenna portions includes a first antenna portion and a plurality of second antenna portions. A first antenna portion is disposed substantially in a central portion of the field, and formed in a substantially circular shape. The second antenna portions form a shape enclosed by one arc, two lines respectively indicating a radius passing through both ends of the one arc, and a line shorter than the one arc and concentric with the one arc. Furthermore, the second antenna portion includes an angle of an inner corner, which is formed by intersecting the two lines indicating the radius on an extended straight line, of at least 180 degrees. Then, areas in a vicinity of the lines respectively indicating the radius of the plurality of the antenna portions are disposed so as to be mutually superimposed.

Thus, even if a single antenna cannot detect the wireless tag, another antenna can detect the wireless tag. Accordingly, it is possible to detect the wireless tag that the die has regardless of the location of the die on the field.

According to an twelfth aspect of the present invention, along with the detection device according to the seventh aspect, the reader main body performs switching of detection of the wireless tags by the plurality of the antenna portions in a predetermined order.

According to a thirteenth aspect of the present invention, along with the detection device according to the seventh aspect, the wireless tag is disposed in each face of the die.

According to an fourteenth aspect of the present invention, a detection device, which is used in a gaming machine that detects a number of dots on a die having a wireless tag, and reads the number of dots on the die, includes: a detection device main body; and a moving part that moves relative to the detection device main body, in which the moving part includes: a field that supports the die; an antenna portion that receives information stored in the wireless tag; and a first communication portion that is connected to the antenna portion and performs wireless communication, and in which the detection device main body includes: a second communication portion that wirelessly performs communication with the first communication portion; a reader that is connected to the second communication portion and reads information stored in the wireless tag by way of the antenna portion; and a controller that controls the reader.

According to the fourteenth aspect of the present invention, the detection device according to the present invention is used in a gaming machine that detects a number of dots on a die having a wireless tag and reads the number of dots on the die. The moving part includes a field that supports the die, an antenna portion that receives information stored in the wireless tag, and a first communication portion that is connected to the antenna portion. In addition, the detection device main body includes a second communication portion that wirelessly performs communication with the first communication portion, a reader that is connected to the second communication portion and reads information by way of the antenna portion, and a controller that controls the reader.

Thus, since it is possible to perform wireless communication between the first communication portion of the moving part and the second communication portion of the detection device main body, it is not necessary to connect the moving part with the detection device main body by a wire, and thus it is possible to prevent malfunction due to deterioration and damage of a wire and the like.

According to a fifteenth aspect of the present invention, along with the detection device according to the fourteenth aspect, the antenna portion further includes a switch portion through which the reader switches the antenna portion between on and off states in response to an instruction signal from the controller.

According to the fifteenth aspect of the present invention, along with the detection device according to the fourteenth aspect, the antenna portion includes the switch portion that switches whether electric current is supplied to the antenna portion in response to an instruction signal from the controller. Therefore, it is possible to switch the antenna portion between on and off states when the antenna portion detects a wireless tag.

According to a sixteenth aspect of the present invention, along with the detection device according to the fifteenth aspect, the switch portion performs switching by way of photo-MOSFET principle.

According to the sixteenth aspect of the present invention, along with the detection device according to the fifteenth aspect, the switch portion performs switching by way of photo-MOSFET principle.

According to a seventeenth aspect of the present invention, along with the detection device according to the fourteenth aspect, the first communication portion is disposed on a side of a bottom surface of the field, and the second communication portion is disposed in the detection device main body so as to face the first communication portion.

According to the seventeenth aspect of the present invention, along with the fourteenth aspect, the first communication portion is disposed on a side of a bottom surface of the field, and the second communication portion is disposed in the detection device main body so as to face the first communication portion. Thus, even in a case in which the moving part moves in a vertical direction, the first communication portion and the second communication portion are constantly located in a position to face each other, which can prevent a communication error between the first communication portion and the second communication portion.

DETAILED DESCRIPTION OF THE INVENTION

First Embodiment

Embodiments of the present invention will be described below with reference to the accompanying drawings.

Figure 1:
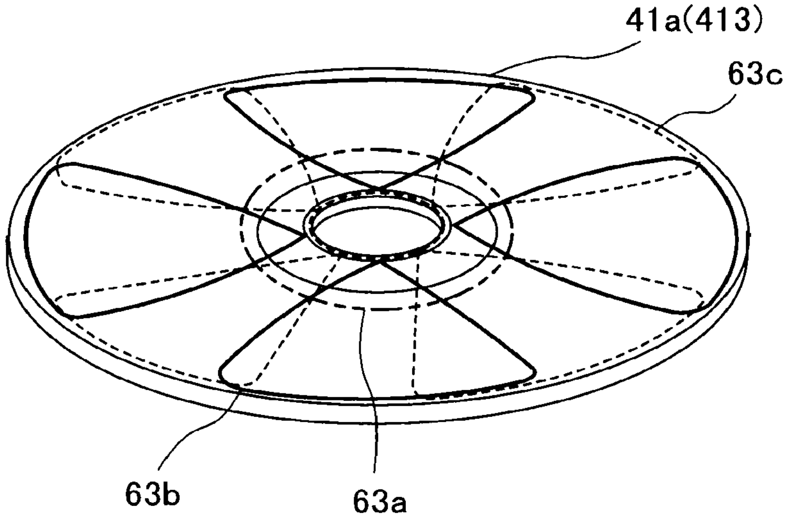
FIG. 1 is a schematic representation of an antenna of a playing board according to an embodiment of the present invention.

FIG. 1 shows a playing board 41*a*, which is a field where a die rolls in a gaming machine providing a dice game. On the playing board 41*a* are disposed three antennas, 63*a*, 63*b*, and 63*c* (hereinafter, an antenna 63 in a case of being referred to collectively) that are connected to a reader for detecting a wireless IC tag embedded in a die. The antennas 63*a*, 63*b*, and 63*c* are disposed so as to form a loop, respectively. The antenna 63*a* is disposed in a circular shape so as to surround an approximate center of the playing board 41*a*, and the antennas 63*b* and 63*c* are formed so that four areas of substantially triangular shape, respectively, are formed so as to depict a cross shape around an apex thereof, and bottom portions of substantially triangular shape are formed with a curve so as to follow the circumference of the playing board 41*a*. Then, an area surrounded by the antennas 63*a*, 63*b*, and 63*c* becomes detection areas. These three detection areas are formed so as to be superimposed with the other areas mutually and a die can be detected regardless of the location on the playing board 41*a*.

Figure 2:
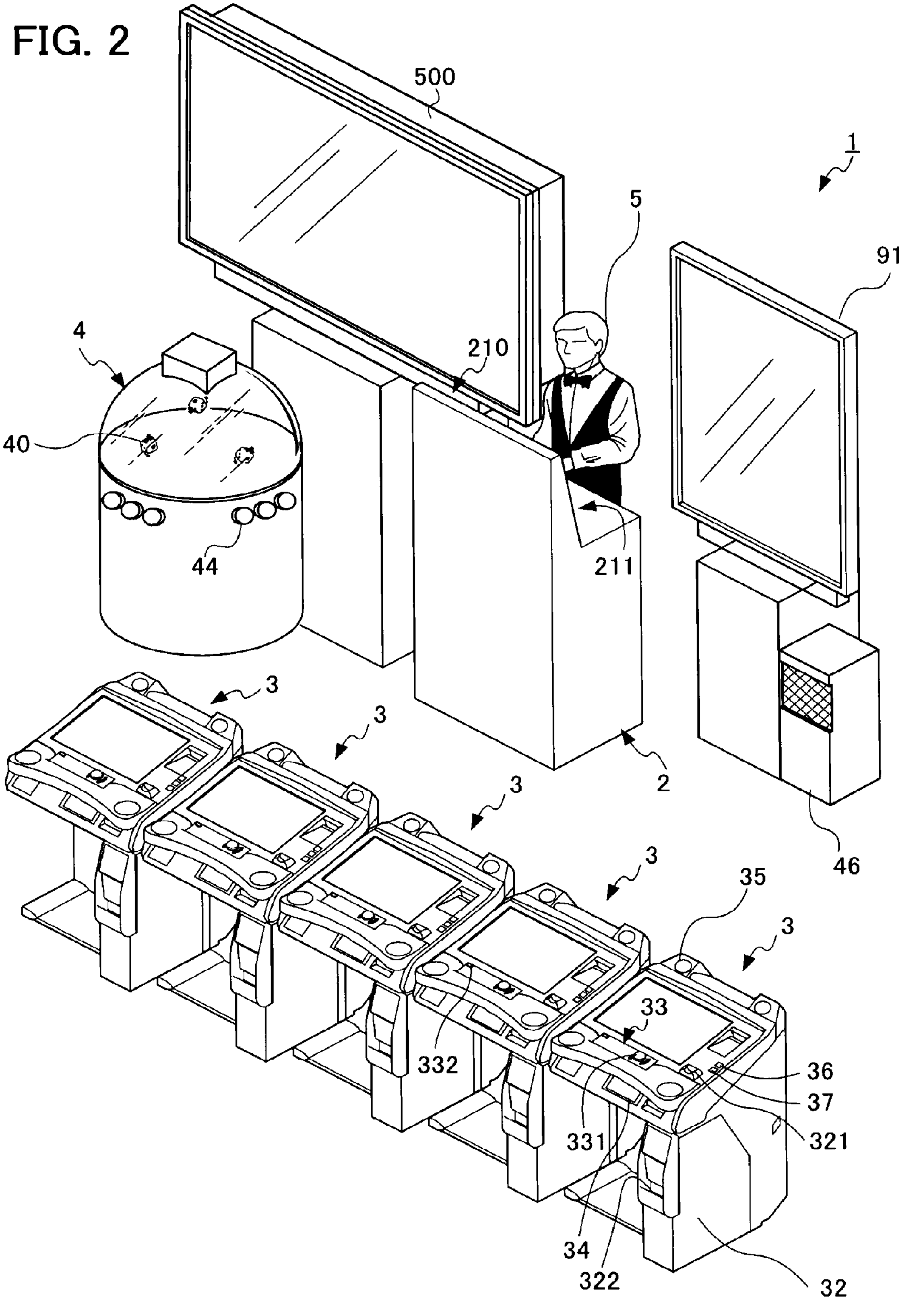
FIG. 2 is an overall view of a gaming machine that provides a dice game according to an embodiment of the present invention.

FIG. 2 is an overall view of a gaming machine 1 that provides a dice game. The gaming machine 1 of the present embodiment includes a controller 2, stations 3, and a dice movable unit 4. Furthermore, a history display unit 91 and an external large-size monitor 500 are provided at a location where players playing at stations 3 can visually recognize.

The controller 2 controls the entire gaming machine 1. Furthermore, in the present embodiment, the controller 2 includes a dealer used display 210 that is used by a dealer 5 who advances a game and a touch panel 211 provided at the dealer used display 210, and executes a control for the overall gaming machine 1 according to an operation of the dealer 5.

The stations 3 are terminals that players operate. The stations 3 accept bet operations by players sitting on chairs (not shown) provided in front of the stations 3 and pay out awards of games.

The station 3 includes an image display device 31, a game media acceptance device that accepts game media such as medals inserted to an insertion opening 321 and used for a game, an operation unit 33 composed of a shake button 331 to which a predetermined instruction is inputted by a player, a game information display unit 34 for displaying information related to a game, and the like. The player may participate in a game by operating the operation unit 33 or the like while viewing the image displayed on the image display device 31.

In the present embodiment, a shake button 331 and a select button 332 are provided at the operation unit 33. The shake button 331 is a button for performing an instruction that allows a player to start rolling dice at a predetermined timing. Furthermore, in a case other than the bet operation, the select button 332 is pushed for confirming the input that a player performed.

In addition, a speaker 35, which can output sound, is disposed on the upper right of the image display device 31 on each of the stations 3.

A plurality of buttons is provided on the side part of the image display device 31 on each of the stations 3. More specifically, a payout button 36 and a help button 37 are disposed thereat.

The payout button 36 is a button which is usually pressed at the end of a game, and when the payout button 36 is pressed, game media corresponding to credits that the player has acquired is paid out from the payout opening 322.

The help button 37 is a button that is pressed in a case where a method of operating the game is unclear, and upon the help button 37 being pressed, a help screen showing various kinds of operation information is displayed immediately thereafter on the image display device 31.

Another operation is performed by the player touching a display screen displayed on the image display device 31. Since a touch-sensitive sensor is installed on the surface of the image display device 31, various operations are recognized by the player touching through a so-called touch panel system.

The dice movable unit 4 rolls a plurality of the dice 40 used in a Sic Bo game. An award is determined based on a combination of numbers being appeared on an upper face (hereinafter, a number of dots on dice) when a plurality of the dice 40 is caused to roll and stop. In other words, a random number can be obtained by rolling a plurality of the dice 40.

The history display unit 91 displays history of a game such as including a number of dots on the dice. Details thereof are described later.

The external large-size monitor 500 is a display device that displays live images such as for advancement of a game, a demonstration screen, and the like.

Dice Movable Unit

Figure 3:
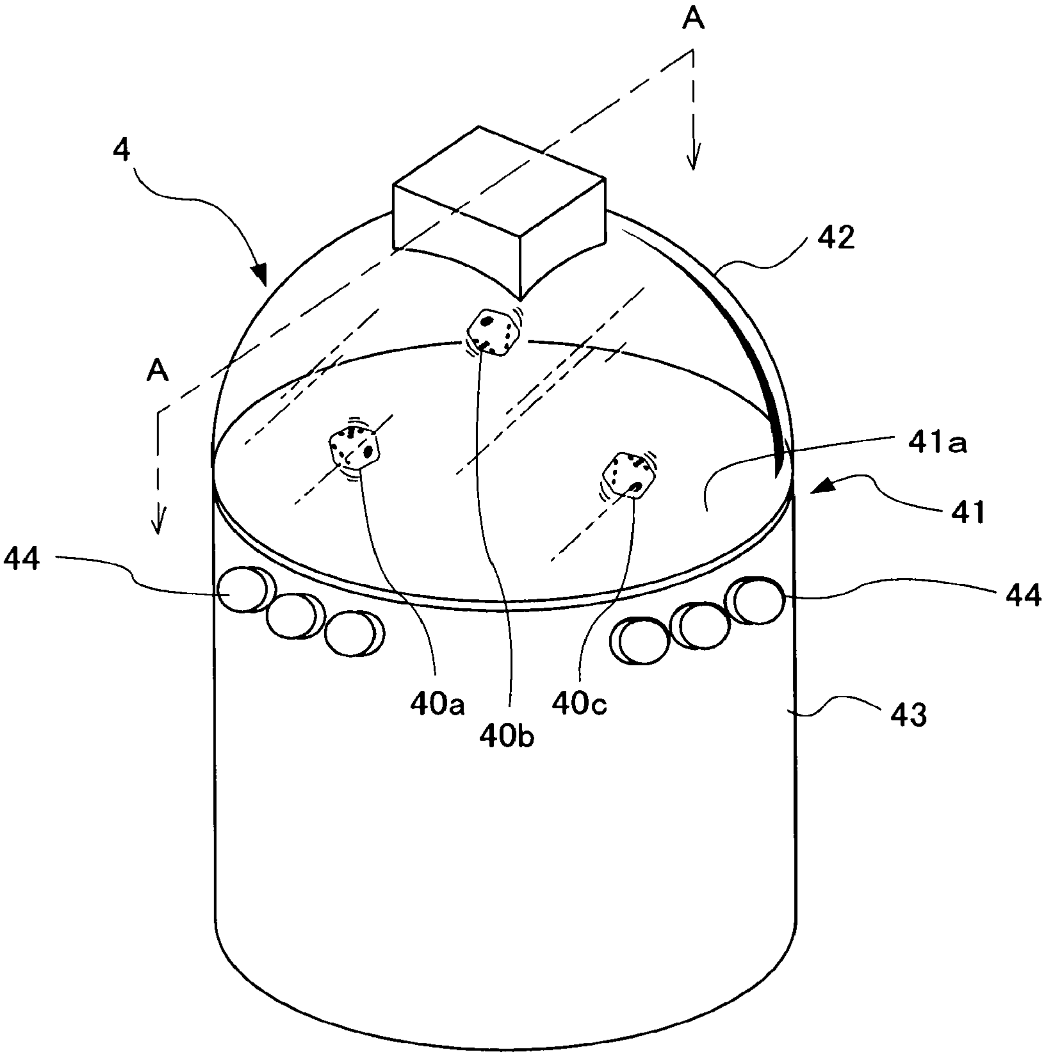
FIG. 3 is a perspective view showing a dice movable unit according to an embodiment of the present invention.
Figure 4:
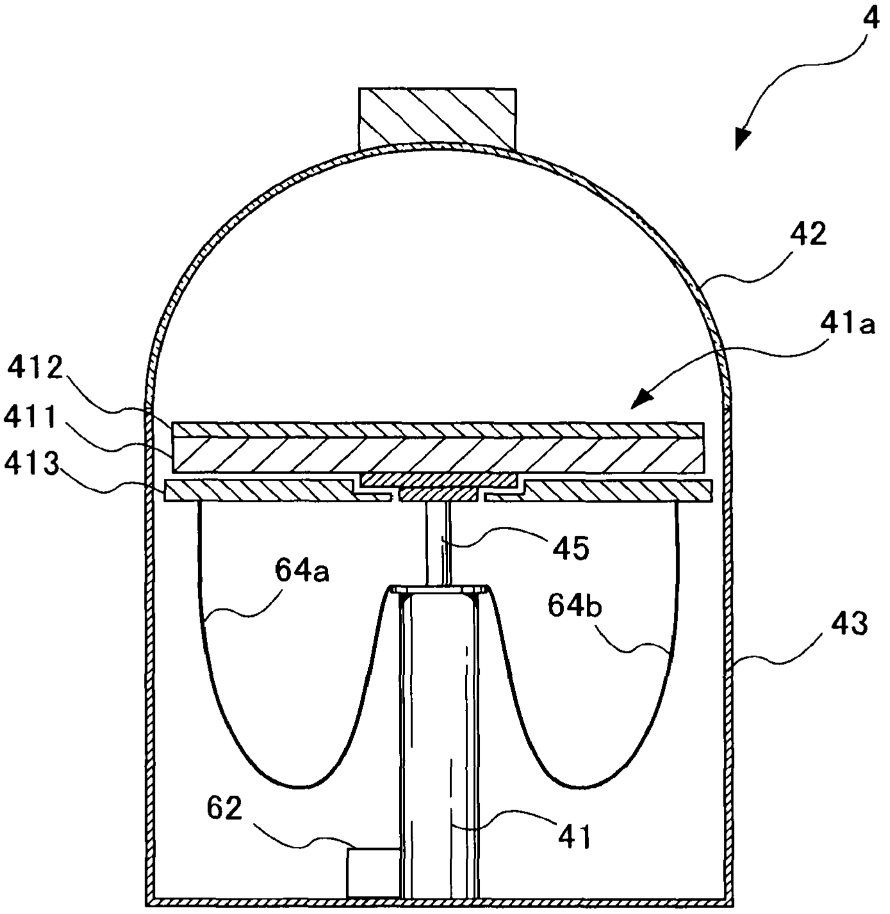
FIG. 4 is a diagram illustrating a cross-section A-A of FIG. 3.
Figure 5:
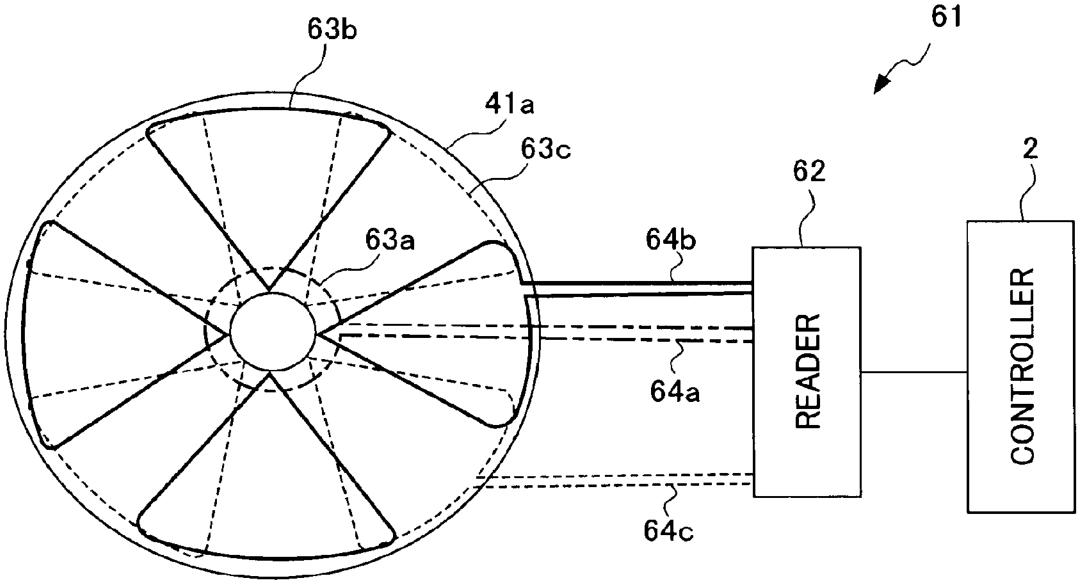
FIG. 5 is a configuration diagram of a detection device according to an embodiment of the present invention.

A dice movable unit 4 is described with reference to FIGS. 3 and 5. FIG. 3 is a perspective diagram showing a dice movable unit 4. FIG. 4 is a diagram illustrating a cross-section A-A of a dice movable unit 4. FIG. 5 is a configuration diagram of a detection device 61 used in a gaming machine according to the present invention.

The dice movable unit 4 is configured so as to allow a plurality of the dice 40 to roll and stop. This dice movable unit 4 includes a shaking device 41 that is configured so as to allow the dice 40 to roll, a cover member 42 that covers an upper side of the shaking device 41 and is formed in a dome shape, and a unit main body 43 that houses the shaking device 41. In the present embodiment, the shaking device 41 rolls the three dice 40 (the die 40*a*, the die 40*b*, and the die 40*c*).

The cover member 42 is disposed so as to cover the overall top face of the playing board 41*a*. Furthermore, the cover member 42 is made of a transparent member in a substantially hemispherical shape and limits an area in which the dice 40 roll.

A plurality of the dice 40 is disposed at a space formed by the playing board 41*a* and the cover member 42. In the present embodiment, the dice 40 are hexahedral and the IC tags are embedded in each face thereof. It should be noted that this wireless IC tag 401 is embedded in the surface of the dice 40 so as not to be visually recognized from the outside of the dice 40. For example, the dice 40 can be formed by disposing the wireless IC tag 401 at the surface of a member as a base of the dice 40 and then placing a member as a cover thereover. Details thereof are described later.

The dice movable unit 4 includes lamps 44. The lamps 44 perform various rendered effects by emitting lights while the dice 40 are being rolled.

The shaking device 41 is formed in a substantially circular shape as viewed in a plane, supports a plurality of the dice 40, and includes the playing board 41*a* as a field in which a plurality of the dice 40 are rolled and a cylinder portion 45 that oscillates the playing board 41 vertically (see FIG. 4).

Since the playing board 41*a* is formed to be substantially planar, as shown in FIG. 4, the dice 40 are rolled by oscillating the playing board 41*a* substantially in the vertical direction with respect to the horizontal direction of the playing board 41*a* by way of the cylinder portion 45 that supports the playing board 41*a* from a lower face side of the playing board 41*a*. Then, when the oscillation of the playing board 41*a* comes to rest, the dice 40 rolling comes to rest.

Furthermore, the playing board 41*a* includes a playing board main body 411, a cushion member 412 that is disposed on the surface of the playing board main body 411, an antenna base portion 413 that is disposed at a lower face side of the playing board main body 411 and in which the antennas 63*a*, 63*b*, and 63*c* are disposed. It is preferable that members forming these are made of a non-metallic member. Since radio waves are susceptible to the interference of metal, if metal exists near the wireless IC tag 401, the communication range between the reader 62 and the wireless IC tag 401 is reduced, and thus it may prevent the wireless IC tag 401 from being read by the reader 62.

Then, wires 64*a*, 64*b*, and 64*c* are connected from the antennas 63*a*, 63*b*, and 63*c*, which are disposed at the antenna base portion 413, to the reader 62. Since these wires 64*a*, 64*b*, and 64*c* are caused to move as the playing board 41*a* moves along with vertical movement of the cylinder portion 45, the sizes of these wires are formed to be at least longer than the width of the vertical movement of the cylinder portion 45. In addition, the wires 64*a*, 64*b*, and 64*c* are connected to the reader 62 via the cylinder portion 45.

FIG. 5 is a configuration diagram of a detection device 61 used on a gaming machine according to the present invention. The detection device according to the present invention is provided at the dice movable unit 4 that rolls a plurality of the dice 40 in a dice game, so-called SIC BO, and is used for detecting numbers of dots on a plurality of the dice 40.

This detection device 61 is mainly configured with the reader 62 that reads information stored in the wireless IC tags 401 which are disposed on each of the faces of the dice 40. The reader 62 includes a control circuit that can be connected to a higher-level device such as a PC and a plurality of loop-shaped antennas 63 that are disposed on the playing board 41*a* as a field in which a plurality of dice 40 rolls. In addition, the reader 62 is connected with the controller 2.

The reader 62 reads information stored in the wireless IC tag 401, and decodes and transmits the information thus read to the controller 2. In the present embodiment, communication between the reader 62 and the wireless IC tag 401 is performed by way of electromagnetic induction. That is, the reader 62 flows current to the antenna 63 based on an instruction signal from the controller 2 and transmits a predetermined command to the wireless IC tag 401. Then, a magnetic field is altered within the area surrounded by the loop-shaped antenna 63 in which the current flew. Along with the alteration of magnetic flux in this magnetic field, electromotive force is generated within the loop antenna that is included in the wireless IC tag 401 which is disposed within the area. Herewith, electric power is transmitted to the wireless IC tag 401, whereby communication with the wireless IC tag 401 is performed.

In the present embodiment, three antennas 63 of the reader 62 are provided and disposed so that at least a portion of each of the detection areas thereof is mutually superimposed (see FIG. 1). In addition, among the three antennas 63, the antenna 63*a* as a first antenna portion is disposed substantially at the center of the playing board 41*a* and is formed so as to depict a substantially circular shape.

Furthermore, the antennas 63*b* and 63*c* as second antenna portions are formed so that four areas of substantially triangular shape depict a cross shape around an apex thereof, and bottom portions of substantially triangular shape are formed with a curve so as to follow the circumference of the playing board 41*a*. Thus, the antennas 63*b* and 63*c* are formed so that the width of the edges thereof is larger at the outer side than the center portion of the playing board 41*a*. Then, the antennas 63*b* and 63*c* are disposed so that the areas of substantially triangular shape thereof are disposed alternately and portions of the areas of substantially triangular shape are disposed to be mutually superimposed. More specifically, a lateral portion of the area of substantially triangular shape of an antenna is disposed so as to be superimposed with a portion of the area of substantially triangular shape of another antenna. Thus, the antennas 63*b* and 63*c* are loop antennas formed in a loop-shape so as to be the abovementioned shape.

In the present embodiment, each of the wireless IC tags 401 disposed on a plurality of the dice 40 is read by a single reader 62. Under the abovementioned RFID system, an anti-collision function can be employed which can read a plurality of wireless IC tags by a single reader. For the anti-collision function, there are FIFO (first in first out) type, multi-access type, and selective type, which communicate with a plurality of the wireless IC tags sequentially. FIFO type is a mode to communicate with a plurality of the wireless IC tags sequentially in the order in which each wireless IC tag enters an area in which an antenna can communicate therewith. Multi-access type is a mode that is able to communicate with all the wireless IC tags, even if there is a plurality of the wireless IC tags simultaneously in the area in which an antenna can communicate with the wireless IC tags. Selective type is a mode that is able to communicate with a specific wireless IC tag among a plurality of the wireless IC tags in the area in which an antenna can communicate therewith. By employing the abovementioned modes, it is possible to read a plurality of the wireless IC tags with a single reader.

The wireless IC tag 401 is configured so as to be read by the reader 62 by way of radio wave or electromagnetic induction. A wireless IC tag 401 with electromagnetic induction is configured with a loop antenna and an IC chip having a control circuit, memory, a rectifying circuit, and a transmission/reception circuit, and information related to a number of dots on the dice 40 is stored in the memory.

At this time, if electric power is transferred to the three antennas 63*a*, 63*b*, and 63*c* simultaneously, these antennas may interfere with each other since the detection areas thereof are mutually superimposed. For this reason, based on the instruction signal from the controller 2, by transferring the electric power to each of the three antennas 63*a*, 63*b*, and 63*c* in a predetermined order, the antenna 63 that detects the wireless IC tag 401 is switched. More specifically, when the reader 62 receives an instruction signal for reading the wireless IC tag 401 from the controller 2, the reader 62 reads and executes a predetermined program stored in a storage unit (not shown) of the reader 62. This program determines the order of transferring the electric power to a plurality of the antennas 63, which detect the wireless tag 401, and switches the antenna 63 to which the electric power is transferred. This program includes transmitting a command that commands to transmit predetermined information to the wireless IC tag 401. By executing this program, the reader 62 turns on a plurality of the antennas 63 in a predetermined order and reads information of the wireless IC tag 401.

When the reader 62 receives information received from the antenna 63 and stored in the wireless IC tag 401, the reader 62 transmits the information thus received to the controller 2. At this time, in the wireless IC tag 401, information stored in the memory is encoded (source coding) and further encoded for complying with a transmission channel (transmission coding). Then, upon transmitting the information to the reader 62, the wireless IC tag 401 transmits by modulating into an analogue waveform. The reader 62 demodulates the data thus modulated and returns it to a digital waveform, and further decodes it to the original state and transmits information to the controller 2.

Die

Figure 6:
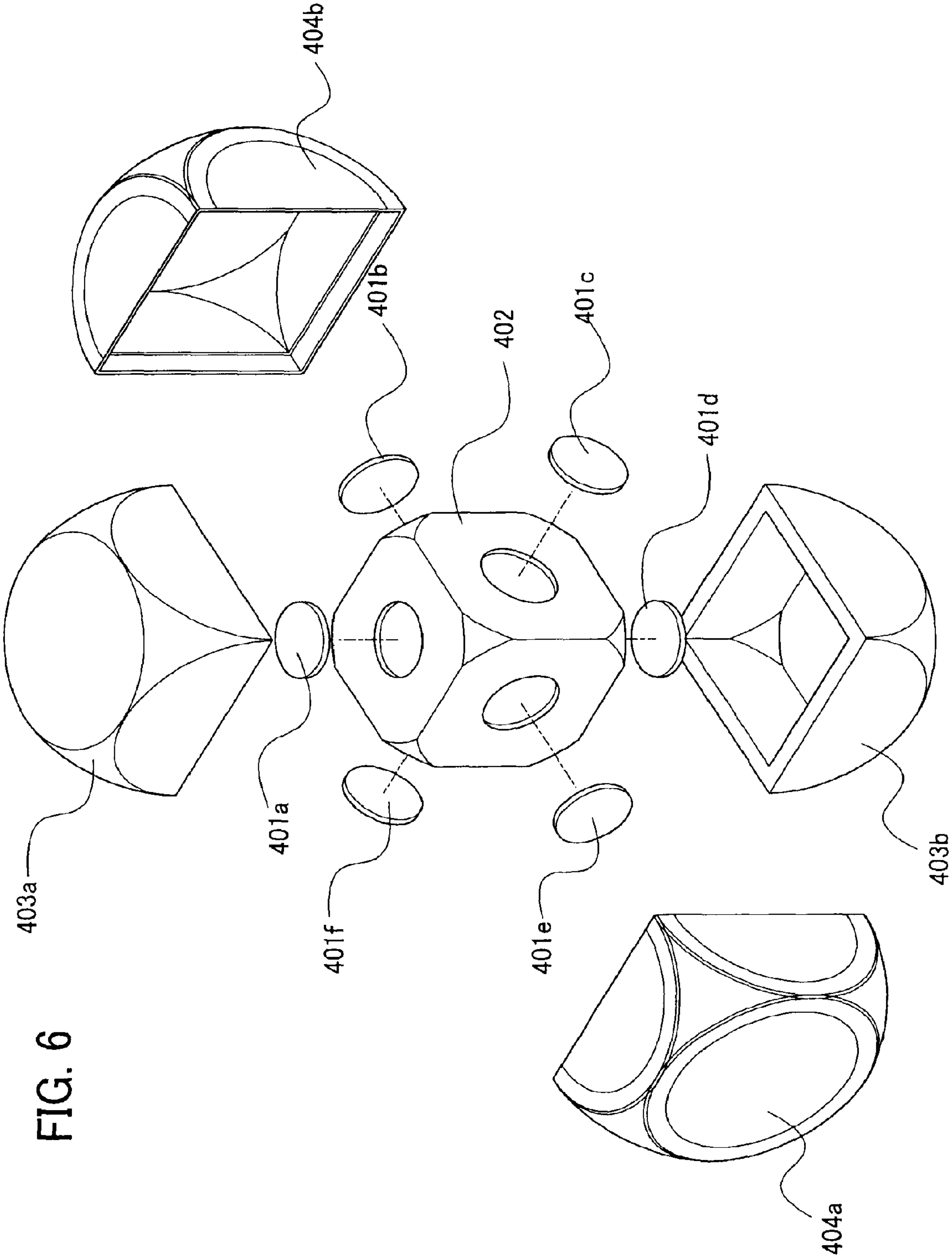
FIG. 6 is an exploded perspective view of a die according to an embodiment of the present invention.

A die 40 is described with reference to FIG. 6. FIG. 6 is an exploded perspective view of a die 40.

A die 40 is composed of a core portion 402, an intermediate portion 403, and a covering portion 404, and the wireless IC tags 401 are disposed between the core portion 402 and the intermediate portion 403. These wireless IC tags 401 are disposed in each face of 6 faces of the die 40.

The core portion 402 is a substantially cubic member which is formed by cutting off corners of the cube. At the substantially central portions of each of the faces of the core portion 402, concave portions are formed in order to embed the wireless IC tags 401, and the wireless IC tags 401*a*, 401*b*, 401*c*, 401*d*, 401*e*, and 401*f* are disposed at each of the six concave portions.

The intermediate portion 403 is configured by combining a first intermediate portion 403*a* with a second intermediate portion 403*b* which are larger than the core portion 402 and are formed by dividing a substantially cubic body in half. The first intermediate portion 403*a* and the second intermediate portion 403*b* have concave portions formed on the insides thereof that each fit half of the core portion 402. Then, for example, by covering the core portion 402 on which the wireless IC tags 401 are embedded, by the first intermediate portion 403*a* from above and the second intermediate portion 403*b* from below, the core portion 402 is covered by the intermediate portion 403.

The covering portion 404 is configured by combining a first external portion 73*a* and a second external portion 73*b* which are slightly larger than the intermediate portion 72 and are formed by dividing a substantially cubic body in half. The first covering portion 404*a* and the second covering portion 404*b* have concave portions formed on the insides thereof that each fit half of the intermediate portion 403. For example, by covering the intermediate portion 403 by the first covering portion 404*a* from left and the second covering portion 404*b* from right, the intermediate portion 403 is covered by the covering portion 404.

It should be noted that it is possible to apply a film-type tag as the wireless IC tag. In this case, it is not necessary to form concave portions in the core portion 402, and it is possible to mount by attaching directly on the core portion 402. On the other hand, in order to reduce flexure of the wireless IC tag in the dice 40, it is particularly preferable that a hard plastic member such as ABS resin is applied to the covering portion 404.

The wireless IC tag 401 can appropriately employ an active tag which embeds a battery, a passive tag operated using electric power transferred from a reader/writer, and a semi-passive tag using electric power of a battery for a sensor operation. Furthermore, appropriate combinations for the wireless IC tag 401 as a reader can be employed. In the present embodiment, a passive tag is employed. In addition, reading the wireless IC tags may not only be done by the non-contact type, but also a contact type. In addition, the reader is not limited thereto, and anything that is appropriately designed with the object of being read may be employed.

Here, in the present embodiment, the number of dots of a face, opposing the face on which the wireless IC tag 401 is embedded, is determined as the number of dots of the dice 40.

More specifically, "one" is stored as data of the number of dots in the wireless IC tag 401 on the face of which the number of dots is "six". "Two" is stored as data of the number of dots in the wireless IC tag 401 on the face of which the number of dots is "five". "Six" is stored as data of the number of dots in the wireless IC tag 401 on the face of which the number of dots is "one". "Five" is stored as data of the number of dots in the wireless IC tag 401 on the face of which the number of dots is "two". "Three" is stored as data of the number of dots in the wireless IC tag 401 on the face of which the number of dots is "four". Finally, "four" is stored as data of the number of dots in the wireless IC tag 401 on the face of which the number of dots is "three".

Then, in a state in which the dice 40 are stopped, the reader 62 reads the wireless IC tag 401 on a face that is in contact with the playing board 41*a* (in other words, a face facing toward the lower side of the dice 40). Then, since data of a number of dots for a face opposite to the face is stored in the wireless IC tag 401 of the face thus read, the face facing the upper side when the dice 40 come to rest is recognized as a number of dots being appeared.

For example, in the dice 40, in a case in which a face that is in contact with the playing board 41*a* is a face of which number of dots is "six", the reader 62 reads data of the IC tag 401 which is embedded in the face of "six". Data of the number of dots stored in the wireless IC tag 401 of the face "six" is "one", which is the number of dots on the face facing opposing the face of "six", the number of dots on the dice 40 is recognized as "one".

Furthermore, the memory of the wireless IC tag 401 includes information of a color in which the dice 40 is made. For example, in a case in which the die 40*a* is made to be red, the memory of the wireless IC tag 401 that is embedded in the red die 40*a* includes information indicating that the color is "red".

Controller

Figure 7:
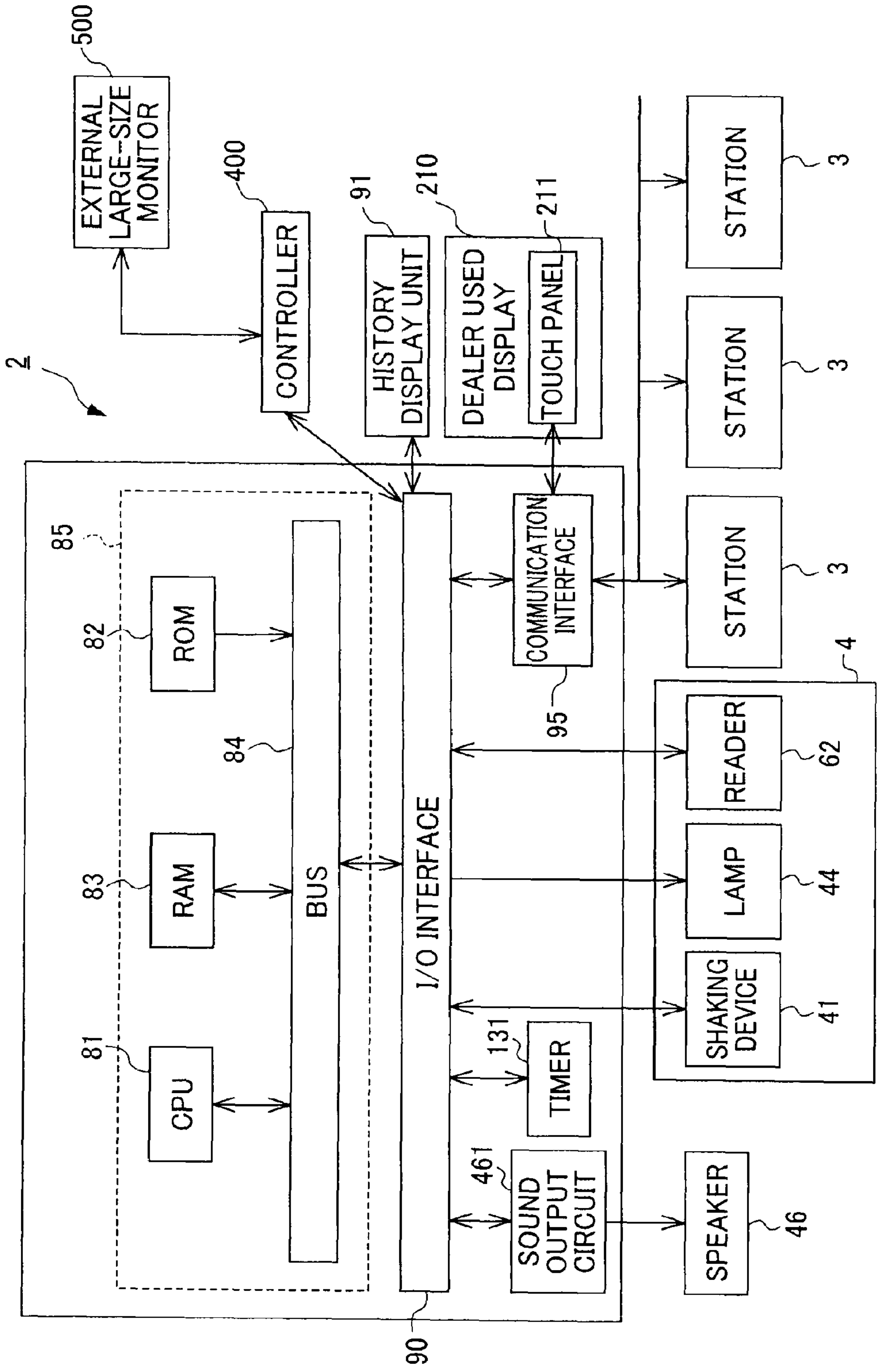
FIG. 7 is a block diagram showing an internal configuration of a controller according to an embodiment of the present invention.

FIG. 7 is a block diagram showing an internal configuration of the controller 2.

The controller 2 perform control of the entire game and transmits to the reader 62 of the dice movable unit 4 an instruction signal for supplying electric power to the antennas 63*a*, 63*b*, and 63*c*.

The controller 2 of the gaming machine 1 includes a microcomputer 85, which is mainly configured with a CPU 81, ROM 82, RAM 83, and a bus 84 that transfers data therebetween.

The CPU 81 is connected with a shaking device 41 via an I/O interface 90. Furthermore, the CPU 81 is connected with a timer 131, which can measure time via the I/O interface 90. In addition, the CPU 81 is connected with a lamp 44. The lamp 44 emits various colors of light for performing various types of rendered effects, based on output signals from the CPU 81. Furthermore, the CPU 81 is connected with a speaker 46 via a sound output circuit 461. The speaker 46 emits various sound effects for performing various types of rendered effects, based on output signals from the sound output circuit 461.

Furthermore, the I/O interface 90 is connected with the reader 62, thereby transmitting and receiving information in relation to the number of dots of the three dice 40, which comes to rest on the playing board 41*a*, between the reader 62. In addition, via a communication interface 95 connected to the I/O interface 90, the controller 2 transmits and receives data such as bet information, payout information, and the like to and from each station 3, as well as data such as bet start instruction images, bet start instruction signals, and the like to and from the dealer used display 210.

ROM 82 in the controller 2 is configured to store a program for implementing basic functions of the gaming machine 1; more specifically, a program for controlling various devices which drive the dice movable unit 4, a program for controlling each station 3, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 3, information on respective number of dots that appear on the dice 40 transmitted from the reader 62, data relating to the results of processing executed by CPU 81, and the like.

A jackpot storage area is provided in the RAM 83. In the jackpot storage area, the data indicating the number of playing media stored cumulatively is stored so as to correspond to each number of dots of matching dice. The data is provided to the station 3 at a predetermined timing, and a jackpot image is displayed.

The CPU 81 control the shaking device 41 of the dice movable unit 4 based on data or a program stored in the ROM 82 or the RAM 83 and oscillates the playing board 41*a* (a shaking motion) of the dice movable unit 4. Furthermore, after the shaking motion of the playing board 41*a* ceases, a control processing associated with game progression, such as confirmation processing for confirming the number of dots on each of the dice 40 resting on the playing board 41*a* is executed.

Furthermore, the I/O interface 90 is connected with a history display unit 91, and the controller 2 transmits and receives information in relation to the number of dots on the die as game history, to and from the history display unit 90.

Furthermore, an external large-size monitor is connected to the I/O interface 90 through the controller 400, and the controller 2 transmits and receives image data and the like to/from the external large-size monitor 500.

On the external large-monitor 500, a game advancement, a game result, a live image of dice rolling, a demonstration screen, and the like are displayed. This attracts interest of people around the external large-size monitor 500.

In addition to the control processing described above, the CPU 81 has a function of executing a game by transmitting and receiving data to and from each station 3 so as to control each station 3. More specifically, the CPU 81 accepts bet information transmitted from each station 3. Furthermore, the CPU 81 performs win determination processing based on the number of dots on the dice 40 and the bet information transmitted from each station 3, and calculates the amount of an award paid out in each station 3 with reference to the payout table stored in the ROM 82.

Modified Examples

Modified examples of the first embodiment are described with reference to FIGS. 8 to 17. The following modified examples configure a detection device 61 in which the shape of the antennas 63 which are disposed at the antenna base portion 413 is varied. In the following, parts different from those of the first embodiment are mainly explained, and explanations of parts that are the same as in the first embodiment are omitted. It should be noted that the same numerals are used in a case in which parts thereof are the same as in the first embodiment.

First Modified Example

Figure 8A:
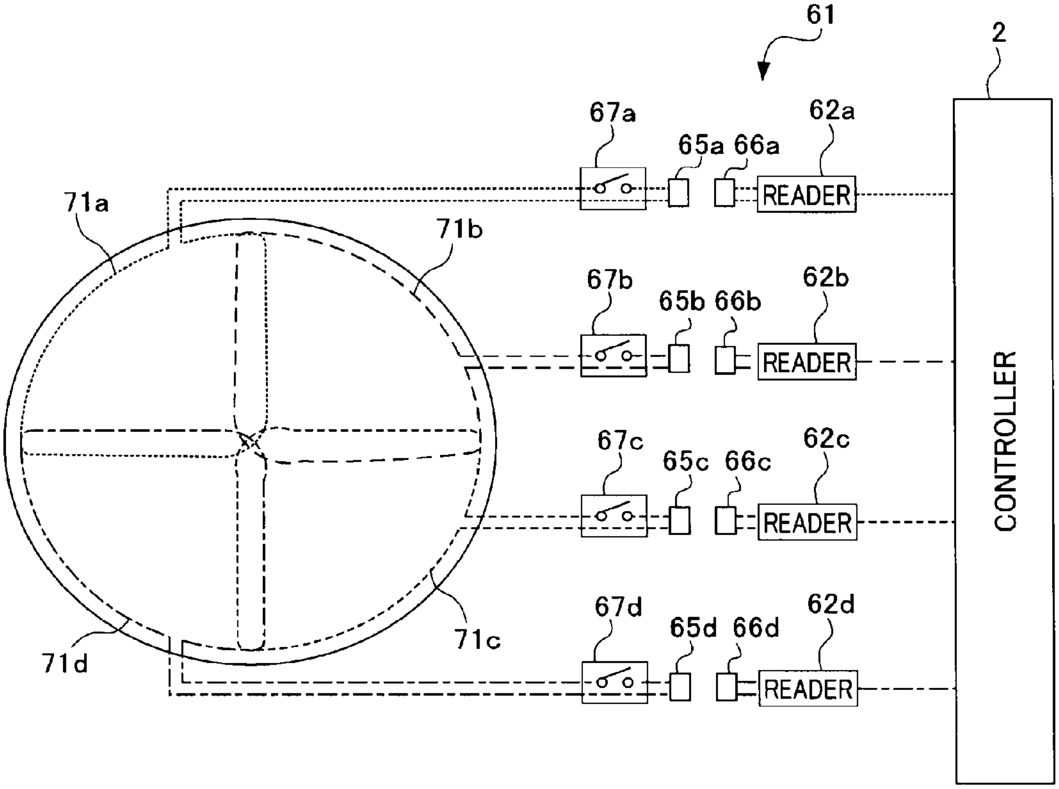
FIG. 8A is a configuration diagram of a detection device according to a first modified example of the present invention.
Figure 8:
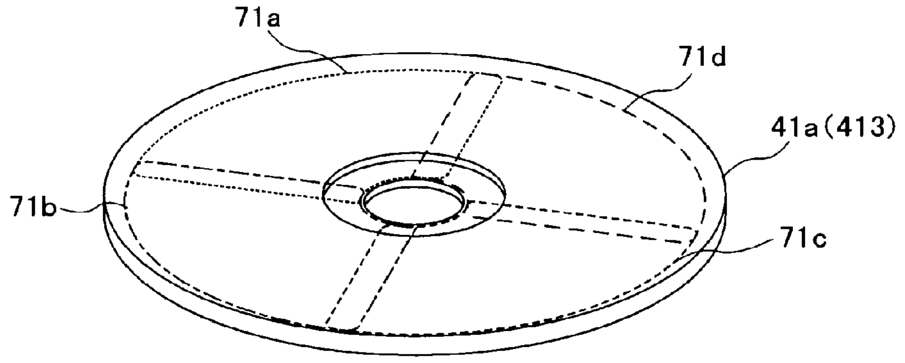
FIG. 8 is a schematic representation of an antenna of a playing board according to a first modification example of the present invention.
Figure 9:
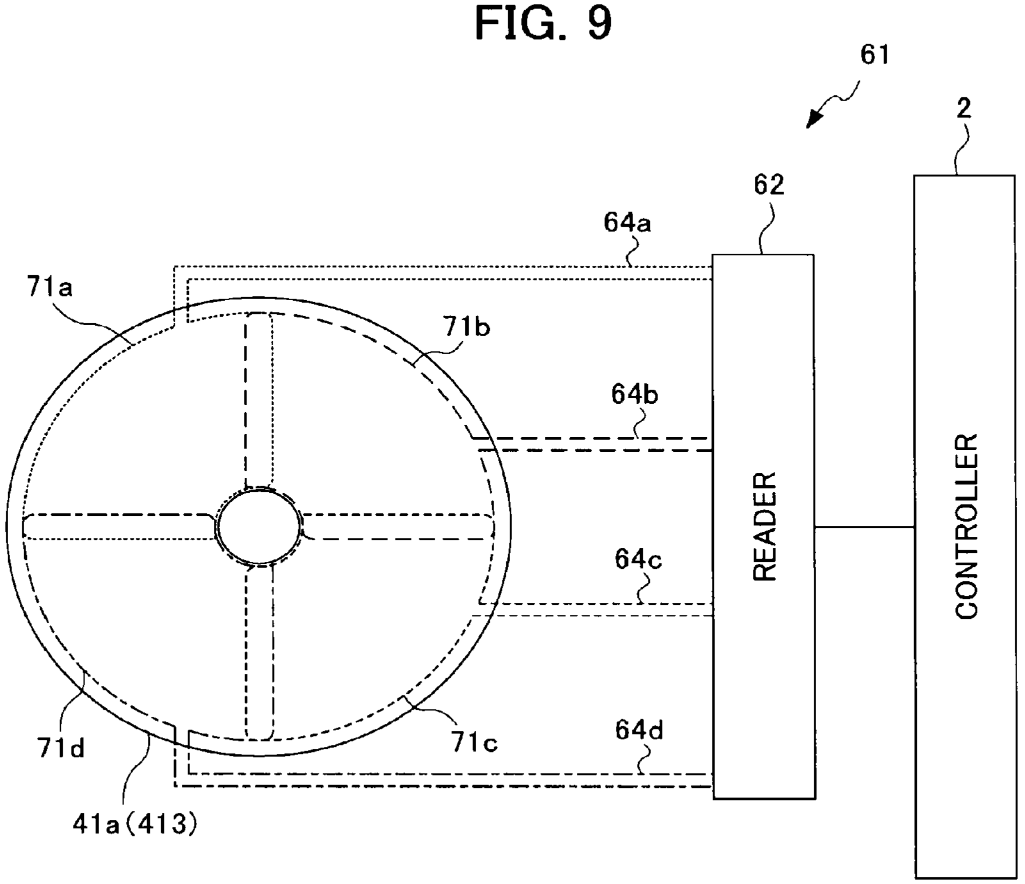
FIG. 9 is a configuration diagram of a detection device according to a first modification example of the present invention.

A first modified example is described with reference to FIGS. 8 and 9. FIG. 8 is a perspective view of a playing board 41*a* at which antennas 71*a*, 71*b*, 71*c*, and 71*d* in the first modified example are disposed. FIG. 9 is a configuration diagram of a detection device 61 in the first modified example.

Four antennas 71 in the detection device 61 of the first modified example are provided. Each of these four antennas 71*a*, 71*b*, 71*c*, and 71*d* is formed in a shape enclosed by one arc, two lines indicating a radius passing through both ends of the one arc, and a line shorter than the one arc and concentric with the one arc. In addition, an angle of an inside corner, which is formed by an extended straight line indicating the radius, is no greater than 180 degrees. That is, each of the shapes of the four antennas 71*a*, 71*b*, 71*c*, and 71*d* is formed so that an angle thereof is smaller than that of a semicircle. In the present embodiment, each of the shapes is formed in a loop-shape of a substantial quarter circle. Then, a portion of the one antenna 71 is disposed so as to be superimposed with a portion of the other antenna 71.

In addition, each of the antennas 71*a*, 71*b*, 71*c*, and 71*d* are connected to the reader 62 by way of fixed lines.

It should be noted that, in the first modified example, although a portion of the detection area that forms each of the antennas 71*a*, 71*b*, 71*c*, and 71*d* is disposed so as to be mutually superimposed, in addition to this, a circular antenna may be disposed substantially at the center of the playing board 41*a*. In this case, it is preferable that the circular antenna is disposed so as to be superimposed with each of the portions of the antennas 71*a*, 71*b*, 71*c*, and 71*d*. This can prevent a situation in which the wireless IC tag 401 cannot read superimposed portions of antenna lines or the center area of the playing board 41*a*.

Second Modified Example

Figure 10A:
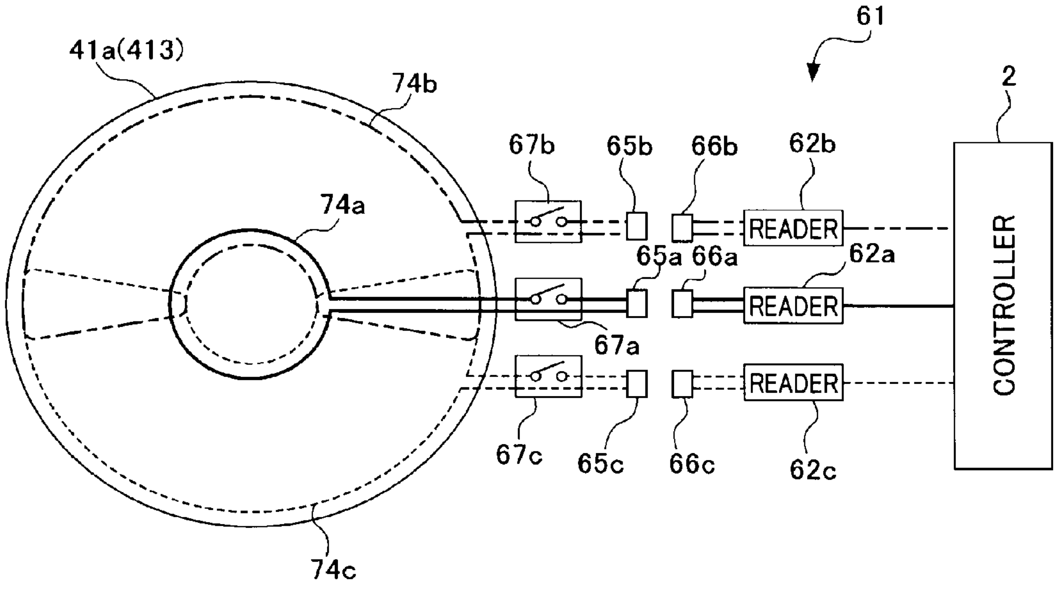
FIG. 10A is a configuration diagram of a detection device according to a second modified example of the present invention.
Figure 10:
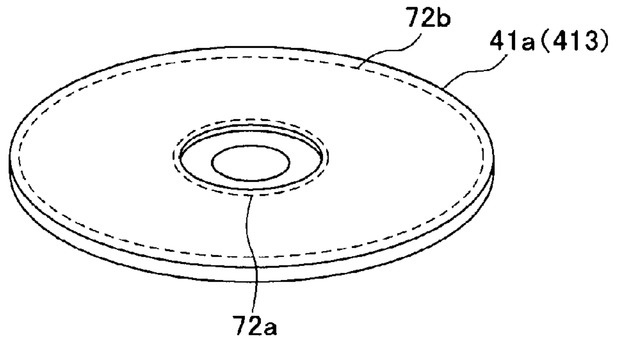
FIG. 10 is a schematic representation of an antenna of a playing board according to a second modification example of the present invention.
Figure 11:
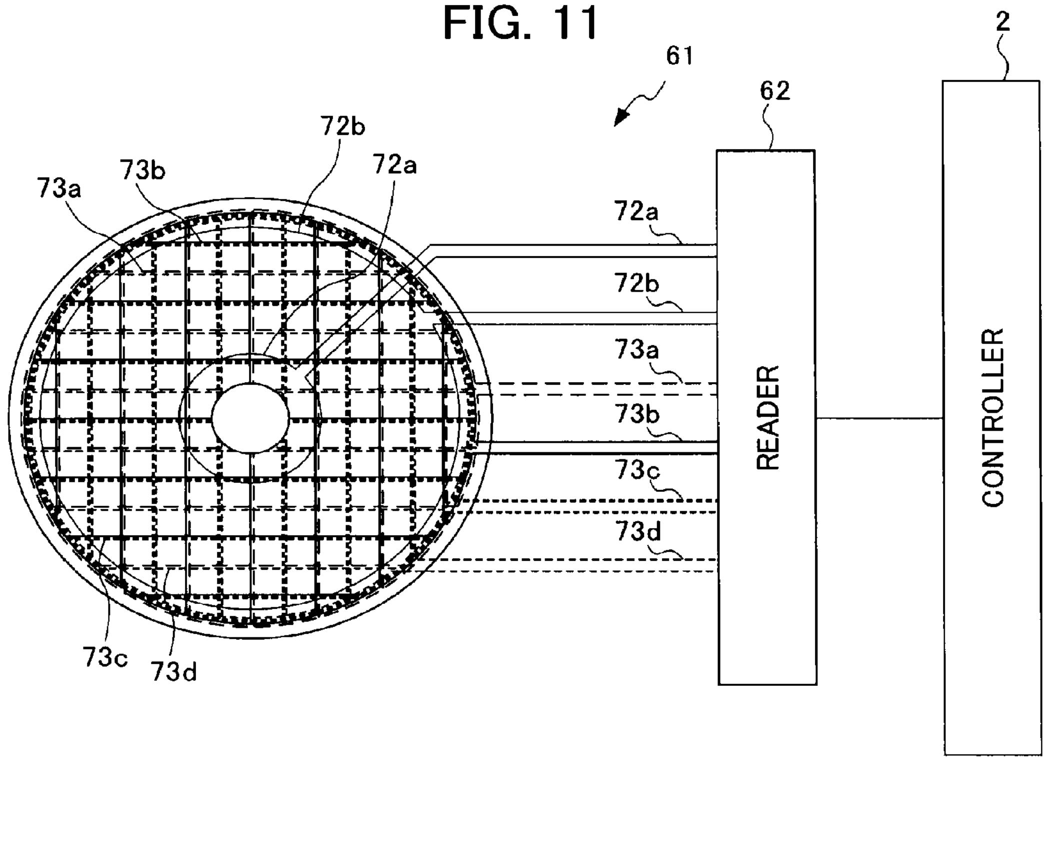
FIG. 11 is a configuration diagram of a detection device according to a second modification example of the present invention.
Figure 12:
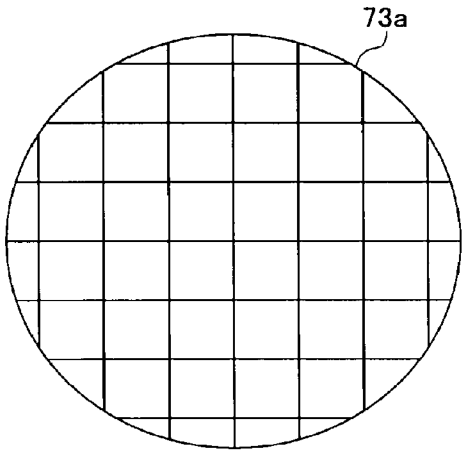
FIG. 12 shows an antenna of a playing board according to a second modification example of the present invention.
Figure 13:
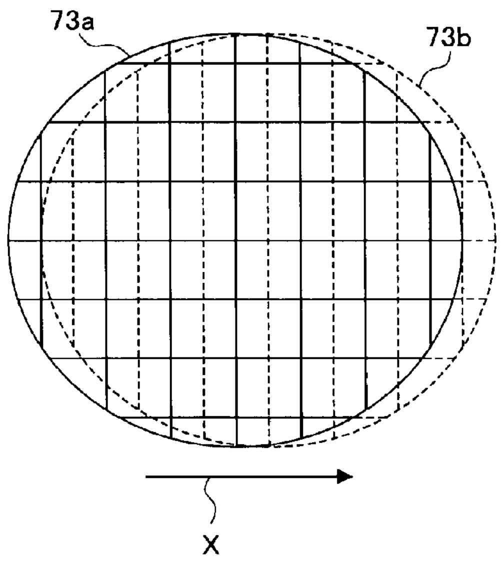
FIG. 13 shows an arrangement of an antenna of a playing board according to a second modification example of the present invention.
Figure 14:
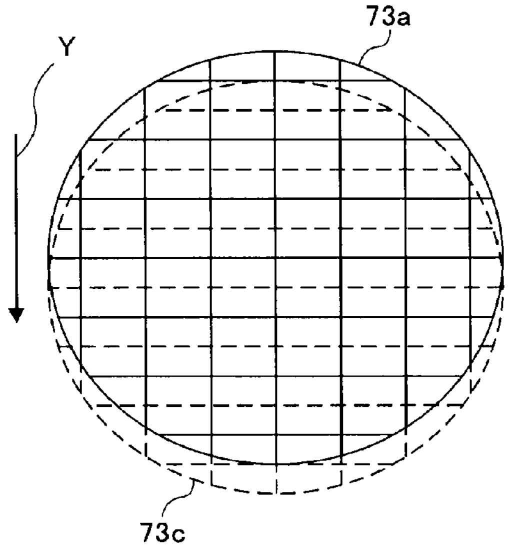
FIG. 14 shows an arrangement of an antenna of a playing board according to a second modification example of the present invention.
Figure 15:
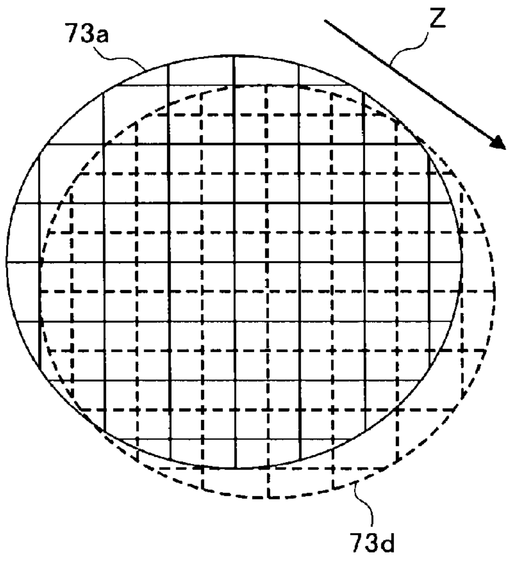
FIG. 15 shows an arrangement of an antenna of a playing board according to a second modification example of the present invention.

A second modified example is described with reference to FIGS. 10 to 15. FIG. 10 is a perspective view of a playing board 41*a* on which transmission antennas 72*a* and 72*b* (hereinafter, a transmission antenna 72 in a case of being referred to collectively) in the second modified example are disposed. FIG. 11 is a configuration diagram of a detection device 61 in the second modified example. FIG. 12 shows a reception antenna 73*a*. FIG. 13 shows a layout of the reception antennas 73*a* and 73*b*. FIG. 14 shows a layout of the reception antennas 73*a* and 73*c*. FIG. 15 shows a layout of the reception antennas 73*a* and 73*d*.

Regarding antennas in a detection device 61 of the second modified example, a transmission antenna 72 and reception antennas 73*a*, 73*b*, 73*c*, and 73*d* (hereinafter, a reception antenna 73 in a case of being referred collectively) are provided, respectively.

As shown in FIG. 10, two transmission antennas 72 are provided substantially in a concentric fashion from the center of the playing board 41*a* as a field. These transmission antennas 72*a* and 72*b* transmit a command and the like that is transmitted from the reader 62 to the wireless IC tag 401 of the dice 40 based on an instruction signal from the CPU 81 of the controller 2.

Four reception antennas 73 are disposed so as to be mutually superimposed below the transmission antenna 72. These four antennas 73*a*, 73*b*, 73*c*, and 73*d* are composed of a plurality of lines disposed in parallel along a first direction and a plurality of lines disposed in parallel along a second direction and that perpendicularly intersects to the first direction. That is, the four antennas 73*a*, 73*b*, 73*c*, and 73*d* are formed in a grid pattern. Then, a circumference of the reception antenna 73 is formed to be circular so as to fit the shape of the playing board 41*a*.

As shown in FIGS. 12 to 15, each of the four antennas 73*a*, 73*b*, 73*c*, and 73*d* is formed in a grid pattern and is superimposed in a state of being moved to be dislocated to a predetermined direction. As shown in FIG. 12, in the present embodiment, assuming that the reception antenna 73*a* is located at a standard position, the reception antenna 73*b* is located in a position where the reception antenna 73*b* is moved in an arrow X direction by the length of half a single grid in the grid pattern from the position where the reception antenna 73*a* is located (see FIG. 13).

In addition, as shown in FIG. 14, the reception antenna 73*c* is located at a position where the reception antenna 73*c* is moved in an arrow Y direction by the length of half a single grid in the grid pattern from the position where the reception antenna 73*a* is located.

Furthermore, as shown in FIG. 15, the reception antenna 73*d* is located at a position where the reception antenna 73*d* is moved in an arrow Z direction by the length of half a diagonal line of a single grid in the grid pattern from the position where the reception antenna 73*a* is located.

Thus, each of the reception antennas 73*a*, 73*b*, 73*c*, and 73*d* is disposed to be dislocated in a predetermined direction. Although it is shown in FIGS. 12 to 15 that those antennas are dislocated for the purpose of explanation, a profile of a case in which the four antennas are superimposed is formed in a circular shape to fit the profile of the playing board 41*a*. Then, the transmission antennas 72*a* and 72*b* and the reception antennas 73*a*, 73*b*, 73*c*, and 73*d* are connected to the reader 62 via a fixed line, respectively.

Third Modified Example

Figure 16:
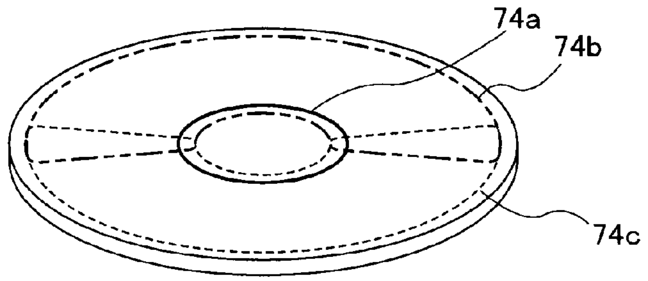
FIG. 16 is a schematic representation of an antenna of a playing board according to a third modification example of the present invention.
Figure 17:
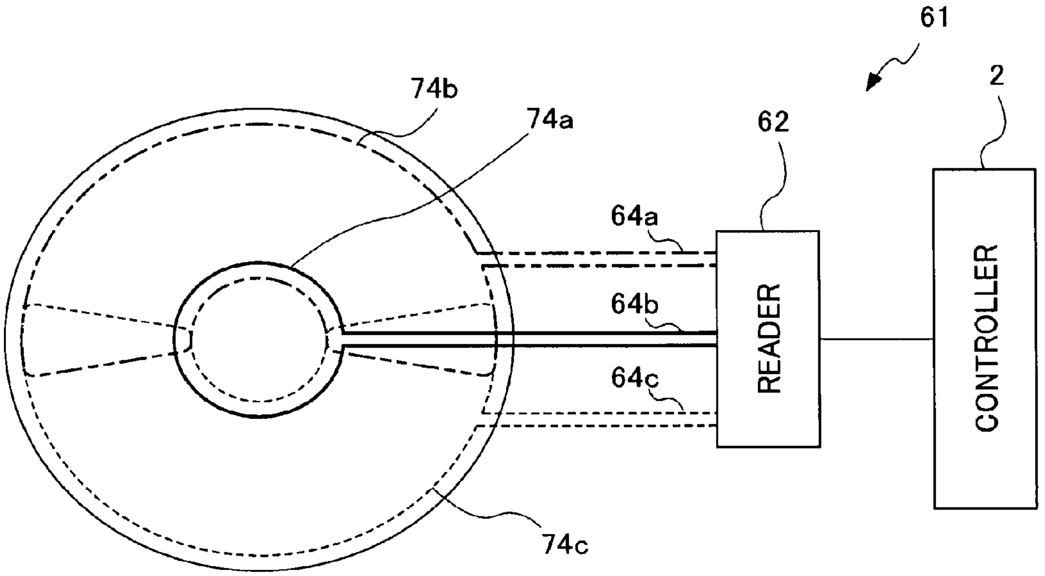
FIG. 17 is a configuration diagram of a detection device according to a third modification example of the present invention.

A third modified example is described with reference to FIGS. 16 and 17. FIG. 16 is a perspective view of a playing board 41*a* on which antennas 74*a*, 74*b*, and 74*c* (hereinafter, an antenna 74 in a case of being referred to collectively) in the third modified example are disposed. FIG. 17 is a configuration diagram of a detection device 61 in the third modified example.

Three antennas 74 in the detection device 61 of the third modified example are provided. Among these three antennas 74*a*, 74*b*, and 74*c*, the antenna 74*a* is disposed substantially at the center of the playing board 41*a* as a field on which the dice 40 roll, and is formed to be a loop-shape of substantial circular shape. In addition, the antennas 74*b* and 74*c* are formed in a shape enclosed by one arc, two lines respectively indicating a radius passing through both ends of the one arc, and a line shorter than the one arc and concentric with the one arc. In addition, an angle of an inside corner, which is formed by an extended straight line indicating the radius, is at least 180 degrees. That is, each of the shapes of the antennas 74*b* and 74*c* is formed so that an angle thereof is at least that of a semicircle. In the present embodiment, each of the shapes is formed in a loop-shape of a substantial semicircle. Each of the shapes is formed in a loop-shape which forms a shape in which two concentric semicircles are tied together by a straight line (a so-called semi-circular doughnut shape). Then, the antennas 74*b* and 74*c* are disposed so that bottom side portions of the semicircles thereof face each other and portions of the areas formed by being enclosed with the antenna 74*b* or 74*c* are mutually superimposed.

In addition, each of the antennas 74*a*, 74*b*, and 74*c* are connected to the reader 62 by way of fixed lines.

Second Embodiment

A second embodiment is described with reference to FIGS. 18 and 19. The second embodiment is different from the first embodiment in regard to a location where an antenna is disposed and a shape thereof. In the following, parts different from those of the first embodiment are mainly explained, and explanations of parts that are the same as in the first embodiment are omitted. It should be noted that the same numerals are used in a case in which parts thereof are the same as in the first embodiment.

Figure 18:
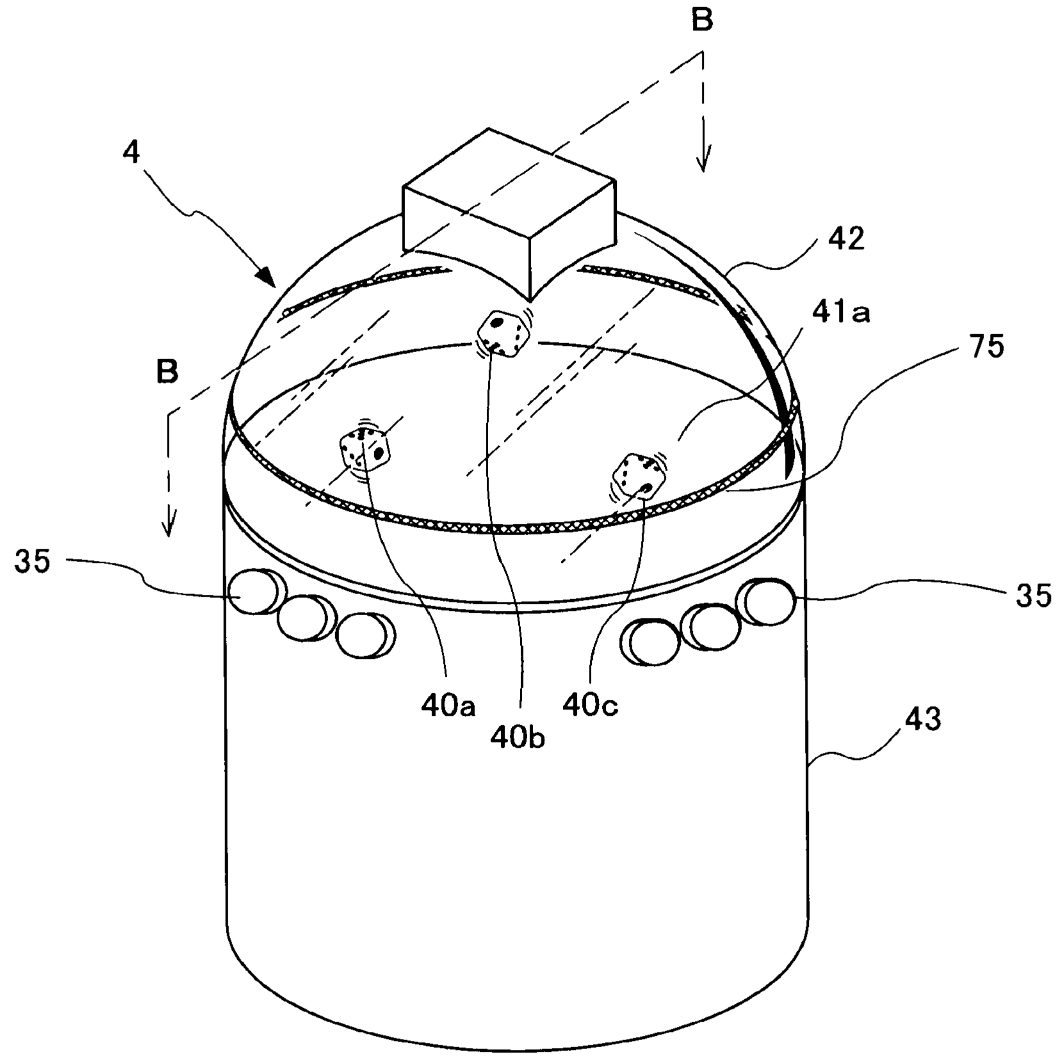
FIG. 18 is a perspective view showing a dice movable unit according to a second embodiment of the present invention.
Figure 19:
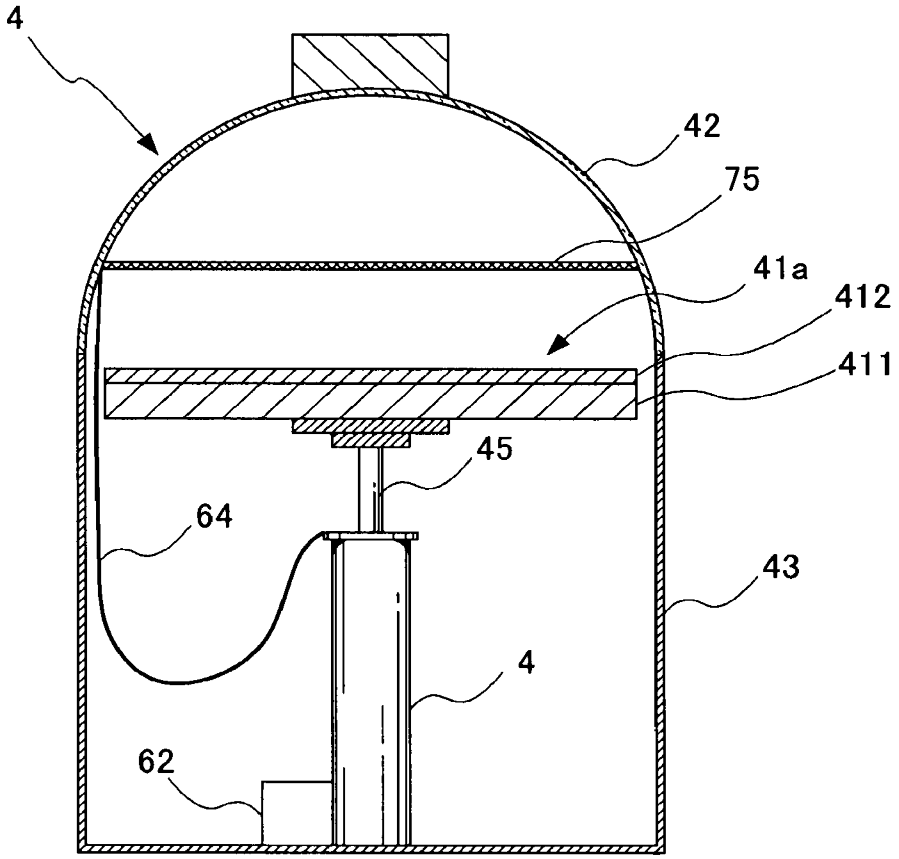
FIG. 19 is a diagram illustrating a cross-section B-B of a dice movable unit according to a second embodiment.

FIG. 18 is a perspective view of a dice movable unit 4 according to the second embodiment. FIG. 19 is a diagram illustrating a cross-section B-B of a dice movable unit 4 according to a second embodiment.

In the second embodiment, only an antenna 75 of the reader 62 is disposed at a cover member 42 that covers an upper side of the playing board 41*a*. In addition, the antenna 75 is formed in a loop-shape so as to follow an inner side of the cover member 42 at a predetermined distance from an upper face of the playing board 41*a*. A predetermined distance from the upper face of the playing board 41*a* depends on the size of the dice 40. In the present embodiment, the antenna 75 reads data stored in the wireless IC tag 401 that is disposed on a face facing an upper side in a state in which the die 40 comes to rest. Thus, the antenna 75 is disposed at a location where it can read a face of the die 40 facing the upper side.

The playing board 41*a* includes a playing board main body 411 and a cushion member 412 that is disposed on the surface of the playing board main body 411, without an antenna base portion 413, as in the first embodiment.

According to the first embodiment, three antennas 63*a*, 63*b*, and 63*c* of the reader 62 are disposed in a loop-shape, respectively, in the playing board 41*a* as a field where the dice 40 having the wireless IC tags 401 on each face thereof roll. Since the portions of the areas formed by these three antennas 63*a*, 63*b*, and 63*c* are disposed so as to be mutually superimposed, the numbers of dots on the dice 40 can be detected regardless of position on the playing board 41*a*.

According to the first embodiment, the reader 62 that has received an instruction signal from the controller 2 supplies electric power to each of the three antennas 63*a*, 63*b*, and 63*c* in a predetermined order according to the instruction signal. Thus, the antenna 63 detects the dice 40 one by one in sequence. In this way, it is possible to prevent interference caused by simultaneous detection.

While an embodiment of the gaming machine according to the present invention has been described, it is to be understood that the above description is intended to be illustrative, and not restrictive, and any changes in design may be made to specific configurations such as various means. Moreover, it should be understood that the advantages described in association with the embodiments are merely a listing of most preferred advantages, and that the advantages of the present invention are by no means restricted to those described in connection with the embodiments.

According to the first embodiment, although the wireless IC tag 401 is a passive tag, the present invention is not limited thereto, and for example, an active tag may be employed. In addition, although electromagnetic induction is employed as a communication mode, the present invention is not limited thereto, and radio waves may be employed.

According to the first embodiment, although the antennas 63*a*, 63*b*, and 63*c* that transfer electric power are switched by executing a predetermined program by the reader 62, the present invention is not limited thereto. For example, it may be configured that the controller 2 transmits to the reader 62 a command for switching the antennas 63*a*, 63*b*, and 63*c* which are turned ON in a predetermined order and the reader 62 performs according to the command.

Third Embodiment

Embodiments of the present invention will be described below with reference to the accompanying drawings.

Figure 1A:
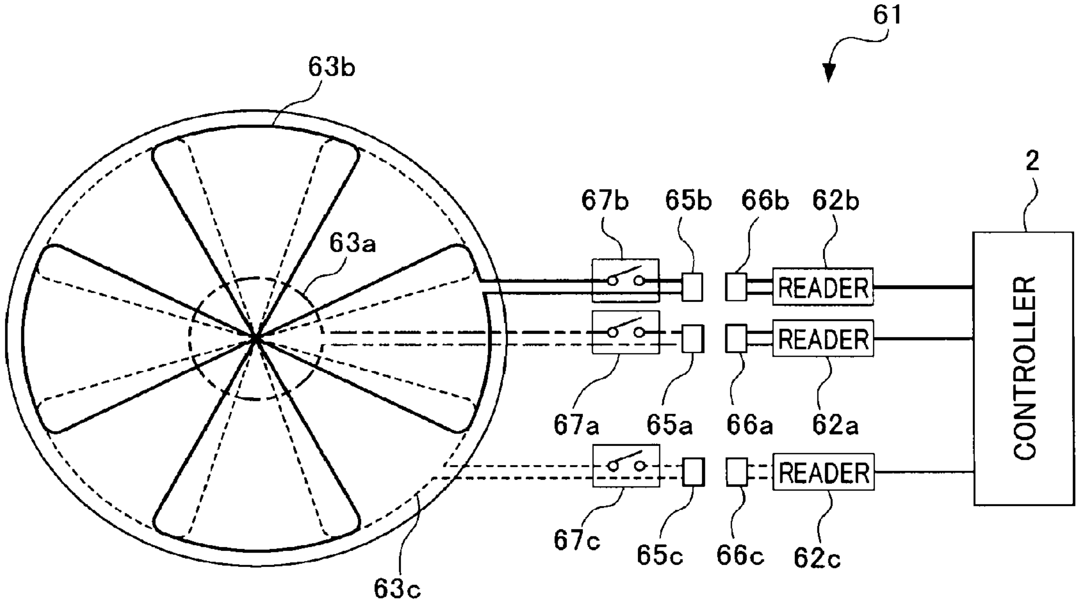
FIG. 1A is a configuration diagram of a detection device according to a third embodiment of the present invention.

FIG. 1A is a configuration diagram of a detection device 61 used in a gaming machine 1 according to the present invention. The detection device according to the present invention is provided at the dice movable unit 4 that rolls a plurality of the dice 40 in a dice game, so-called SIC BO, and is used for detecting numbers of dots on a plurality of the dice 40.

The detection device 61 is composed of a moving part and a detection device main body. The moving part has disposed therein at least a playing board 41*a* as a field on which the dice 40 roll and which supports a plurality of the dice 40*a*, 40*b*, and 40*c* (see FIGS. 2A and 3A; hereinafter, the dice 40 in a case of being referred to collectively), a plurality of antennas 63*a*, 63*b*, and 63*c* (hereinafter, the antenna 63 in a case of being referred to collectively) that are disposed on the playing board 41*a*, and a plurality of first communication portions 65*a*, 65*b*, and 65*c* (hereinafter, the first communication portion 65 in a case of being referred to collectively) that are respectively connected to the plurality of the antennas 63*a*, 63*b*, and 63*c*. Furthermore, the detection device main body is a portion that does not move with respect to the moving part that moves, and at least includes a plurality of second communication portions 66*a*, 66*b*, and 66*c* (hereinafter, the second communication portion 66 in a case of being referred to collectively) that is disposed so as to correspond to the plurality of the first communication portions 65*a*, 65*b*, and 65*c*, respectively, perform wireless communication with the first communication portions 65*a*, 65*b*, and 65*c*, respectively, readers 62*a*, 62*b*, and 62*c* (hereinafter, the reader 62 in a case of being referred to collectively) that are connected to the second communication portions 66*a*, 66*b*, and 66*c*, respectively, and a controller 2 that controls the readers 62*a*, 62*b*, and 62*c*.

The reader 62 reads information stored in wireless IC tags 401*a*, 401*b*, 401*c*, 401*d*, 401*e*, and 401*f* (hereinafter, the wireless IC tag 401) that are embedded on each face of the dice 40, and decodes and transmits the information thus read to the controller 2. In the present embodiment, communication between the reader 62 and the wireless IC tag 401 is performed by way of electromagnetic induction. That is, the reader 62 flows current to the antenna 63 based on an instruction signal from the controller 2 and transmits a predetermined command to the wireless IC tag 401. Then, a magnetic field is altered within the area surrounded by the loop-shaped antenna 63 in which the current flew. Along with the alteration of magnetic flux in this magnetic field, electromotive force is generated within the loop antenna that is included in the wireless IC tag 401 which is disposed within the area. Herewith, electric power is transmitted to the wireless IC tag 401, whereby communication with the wireless IC tag 401 is performed.

In the present embodiment, three antennas 63 of the reader 62 are provided and disposed so that at least a portion of each of the detection areas thereof is mutually superimposed (see FIG. 1A). In addition, among the three antennas 63, the antenna 63*a* is disposed substantially at the center of the playing board 41*a* and is formed so as to depict a substantially circular shape.

Furthermore, the antennas 63*b* and 63*c* are formed so that four areas of substantially triangular shape depict a cross shape around an apex thereof, and bottom portions of substantially triangular shape are formed with a curve so as to follow the circumference of the playing board 41*a*. Thus, the antennas 63*b* and 63*c* are formed so that the width of the edges thereof is larger at the outer side than the center portion of the playing board 41*a*. Then, the antennas 63*b* and 63*c* are disposed so that the areas of substantially triangular shape thereof are disposed alternately and portions of the areas of substantially triangular shape are disposed to be mutually superimposed. More specifically, a lateral portion of the area of substantially triangular shape of an antenna is disposed so as to be superimposed with a portion of the area of substantially triangular shape of another antenna. Thus, the antennas 63*b* and 63*c* are loop antennas formed in a loop-shape so as to be the abovementioned shape.

In the present embodiment, each of the wireless IC tags 401 disposed on a plurality of the dice 40 is read by a single reader 62. Under the abovementioned RFID system, an anti-collision function can be employed which can read a plurality of wireless IC tags by a single reader. For the anti-collision function, there are FIFO (first in first out) type, multi-access type, and selective type, which communicate with a plurality of the wireless IC tags sequentially. FIFO type is a mode to communicate with a plurality of the wireless IC tags sequentially in the order in which each wireless IC tag enters an area in which an antenna can communicate therewith. Multi-access type is a mode that is able to communicate with all the wireless IC tags, even if there is a plurality of the wireless IC tags simultaneously in the area in which an antenna can communicate with the wireless IC tags. Selective type is a mode that is able to communicate with a specific wireless IC tag among a plurality of the wireless IC tags in the area in which an antenna can communicate therewith. By employing the abovementioned modes, it is possible to read a plurality of the wireless IC tags with a single reader.

The wireless IC tag 401 is configured so as to be read by the reader 62 by way of radio wave or electromagnetic induction. The wireless IC tag 401 is configured with a loop antenna and an IC chip having a control circuit, memory, a rectifying circuit, and a transmission/reception circuit, and information related to a number of dots on the dice 40 is stored in the memory. Details thereof are described later.

The first communication portion 65 and the second communication portion 66 can communicate with each other wirelessly. The first communication portion 65 and the second communication portion 66 are disposed between the antenna 63 and the reader 62. The first communication portion 65 is connected to the antenna 63, and the second communication portion 66 is connected to the reader 62. Thus, various commands that are transmitted from the reader 62 toward the wireless IC tag 401 and reply information that the antenna 63 has received from the wireless IC tag 401 are mutually transmitted and received between the first communication portion 65 and the second communication portion 66. The reply information from the wireless IC tag 401 is, for example, information related to a number of dots on dice or other information stored in the memory of the wireless IC tag 401.

The first communication portion 65 also includes a transmission circuit that transmits electric power to the antenna 63 and a loop antenna (not shown) that performs wireless communication with the second communication portion 66.

Furthermore, the switch portions 67*a*, 67*b*, and 67*c* (hereinafter, the switch portion 67 in a case of being referred to collectively) are respectively provided between the first communication portions 65*a*, 65*b*, and 65*c* and the antennas 63*a*, 63*b*, and 63*c* that are respectively connected thereto. This switch portion 67 switches whether electric current is supplied to the antenna 63. In a case in which the switch portion 67 enters the on state, electric power is sent to the antenna 63 from the transmission circuit of the first communication portion 65. In addition, in a case in which the switch portion 67 is in the off state, electric power that is sent from the transmission circuit of the first communication portion 65 is turned off.

In the present embodiment, the switch portion 67 is composed of photo MOSFET (Metal Oxide Semiconductor Field Effect Transistor). Regarding this photo MOSFET, by the light of the light emitting diode, a photovoltaic cell charges a gate capacitance of a FET and increases gate-to-source voltage. Then, the FET conducts and the switch portion 67 enters the on state.

When the light emitting diode (LED) is turned off, not only discharge of a photovoltaic cell stops, but also an internal discharge switch automatically works to discharge a gate charge forcibly, which reduces the gate-to-source voltage, and thus the switch portion 67 enters the off state.

At this time, if electric power is transferred to the three antennas 63*a*, 63*b*, and 63*c* simultaneously, these antennas may interfere with each other. For example, in a case of transmitting an instruction signal for supplying electric power to the antenna 63*a* from the controller 2 to the reader 62*a*, the antennas 63*b* and 63*c* enter the off state, and it is required for the loops which are formed by the antennas 63*b* and 63*c*, respectively, to be cut. This is because, by forming a loop, since the magnetic field is also maintained, radio wave interference may be generated by a relationship with the antenna 63*a* in the on state.

Therefore, the controller 2 transmits instruction signals to the readers 62*a*, 62*b*, and 62*c* that control the antennas 63*a*, 63*b*, and 63*c*, respectively. Then, in a case of turning on a single antenna among the three antennas 63*a*, 63*b*, and 63*c*, the switch portions 67 of the other two antennas are turned to the off state, and a loop of the antenna which does not turn to the off state is cut. In this way, the antenna 63 can be switched between on and off states.

Figure 2A:
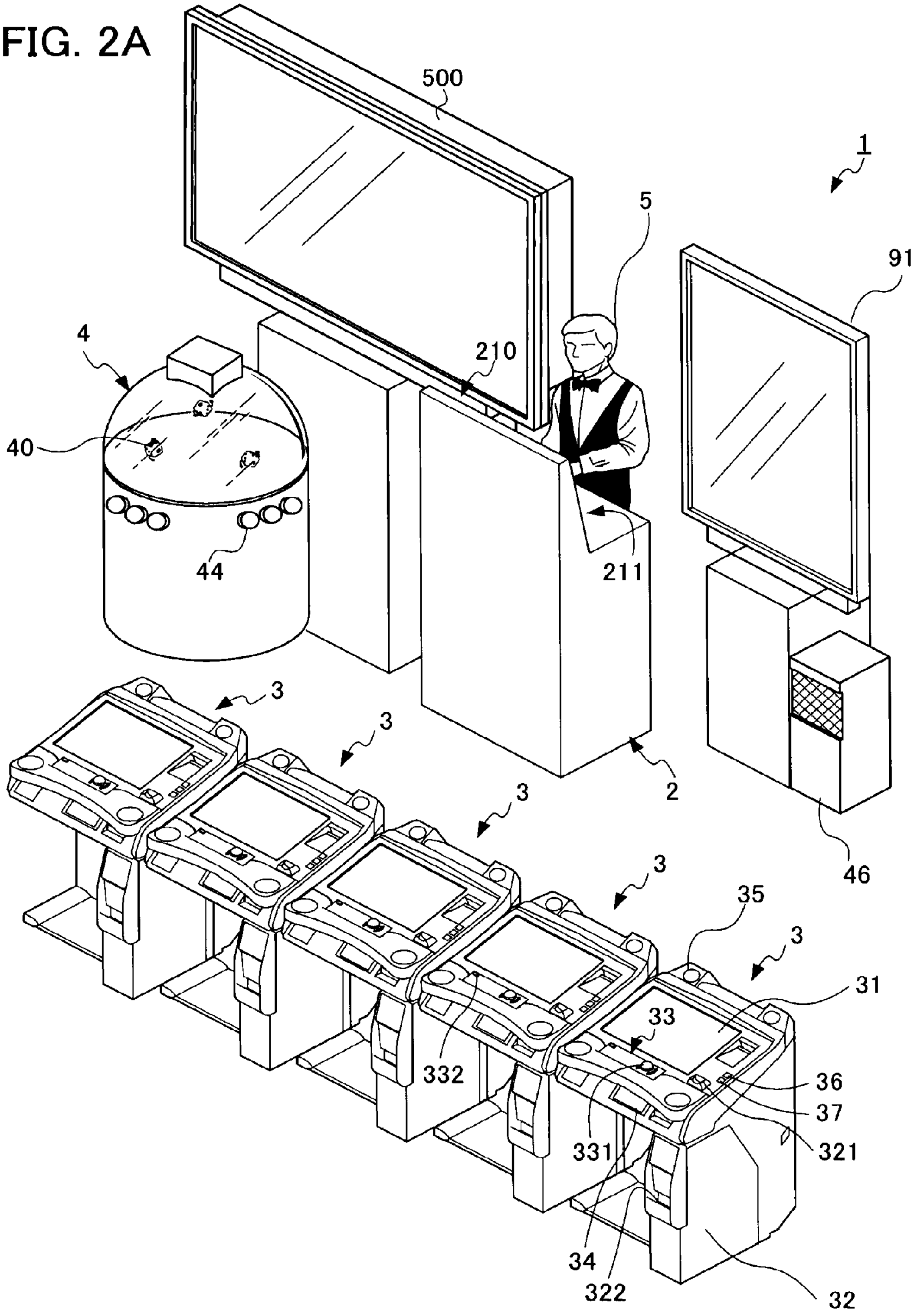
FIG. 2A is an overall view of a gaming machine according to the third embodiment of the present invention.

FIG. 2A is an overall view of a gaming machine 1 that provides a dice game. The gaming machine 1 of the present embodiment includes a controller 2, stations 3, and a dice movable unit 4. Furthermore, a history display unit 91 and an external large-size monitor 500 are provided at a location where players playing at stations 3 can visually recognize.

The controller 2 controls the entire gaming machine 1. Furthermore, in the present embodiment, the controller 2 includes a dealer used display 210 that is used by a dealer 5 who advances a game and a touch panel 211 provided at the dealer used display 210, and executes a control for the overall gaming machine 1 according to an operation of the dealer 5.

The stations 3 are terminals that players operate. The stations 3 accept bet operations by players sitting on chairs (not shown) provided in front of the stations 3 and pay out awards of games.

The station 3 includes an image display device 31, a game media acceptance device that accepts game media such as medals inserted to an insertion opening 321 and used for a game, an operation unit 33 composed of a shake button 331 to which a predetermined instruction is inputted by a player, a game information display unit 34 for displaying information related to a game, and the like. The player may participate in a game by operating the operation unit 33 or the like while viewing the image displayed on the image display device 31.

In the present embodiment, a shake button 331 and a select button 332 are provided at the operation unit 33. The shake button 331 is a button for performing an instruction that allows a player to start rolling dice at a predetermined timing. Furthermore, in a case other than the bet operation, the select button 332 is pushed for confirming the input that a player performed.

In addition, a speaker 35, which can output sound, is disposed on the upper right of the image display device 31 on each of the stations 3.

A plurality of buttons is provided on the side part of the image display device 31 on each of the stations 3. More specifically, a payout button 36 and a help button 37 are disposed thereat.

The payout button 36 is a button which is usually pressed at the end of a game, and when the payout button 36 is pressed, game media corresponding to credits that the player has acquired is paid out from the payout opening 322.

The help button 37 is a button that is pressed in a case where a method of operating the game is unclear, and upon the help button 37 being pressed, a help screen showing various kinds of operation information is displayed immediately thereafter on the image display device 31.

Another operation is performed by the player touching a display screen displayed on the image display device 31. Since a touch-sensitive sensor is installed on the surface of the image display device 31, various operations are recognized by the player touching through a so-called touch panel system.

The dice movable unit 4 rolls a plurality of the dice 40 used in a Sic Bo game. An award is determined based on a combination of numbers being appeared on an upper face (hereinafter, a number of dots on dice) when a plurality of the dice 40 is caused to roll and stop. In other words, a random number can be obtained by rolling a plurality of the dice 40.

The history display unit 91 displays history of a game such as including a number of dots on the dice. Details thereof are described later.

The external large-size monitor 500 is a display device that displays live images such as for advancement of a game, a demonstration screen, and the like.

Dice Movable Unit

Figure 3A:
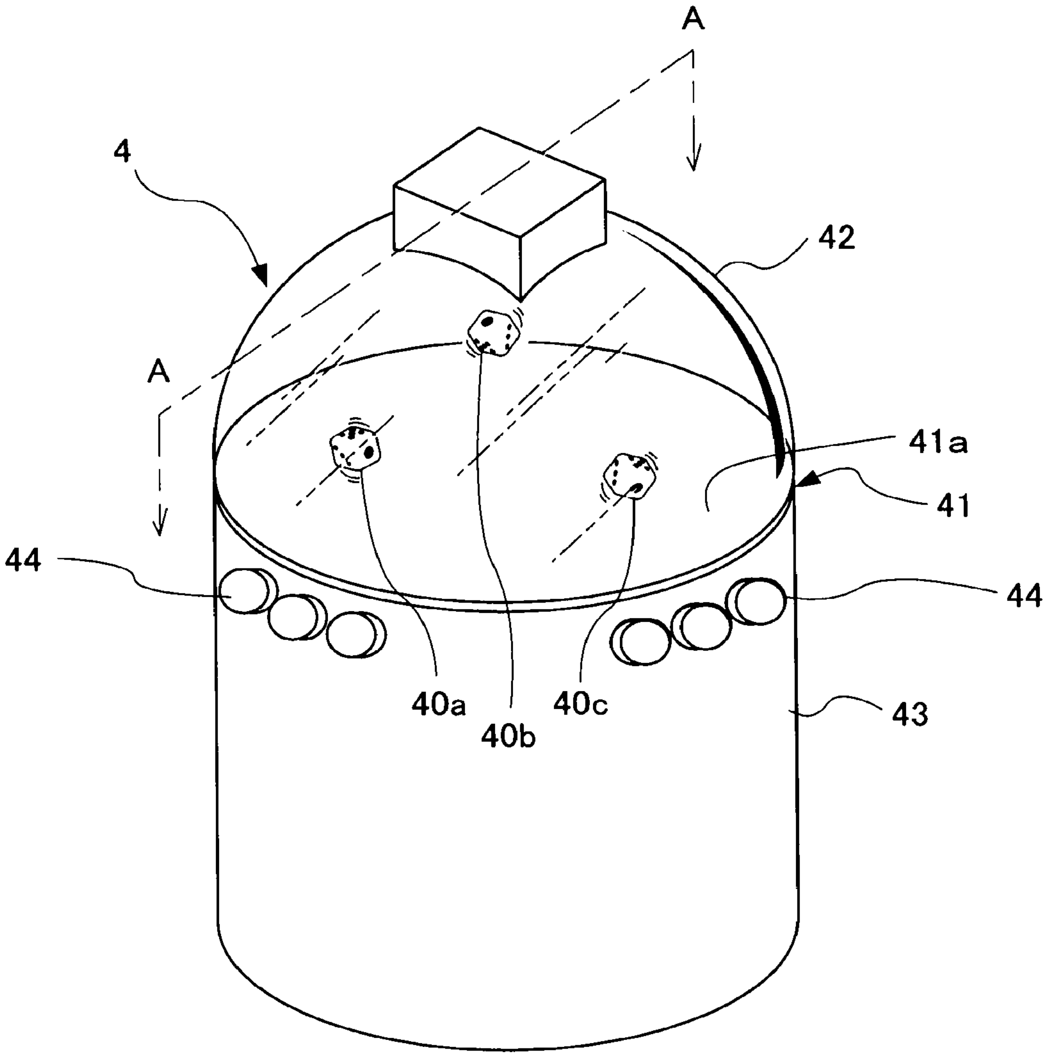
FIG. 3A is a perspective view showing a dice movable unit according to a third embodiment of the present invention.
Figure 4A:
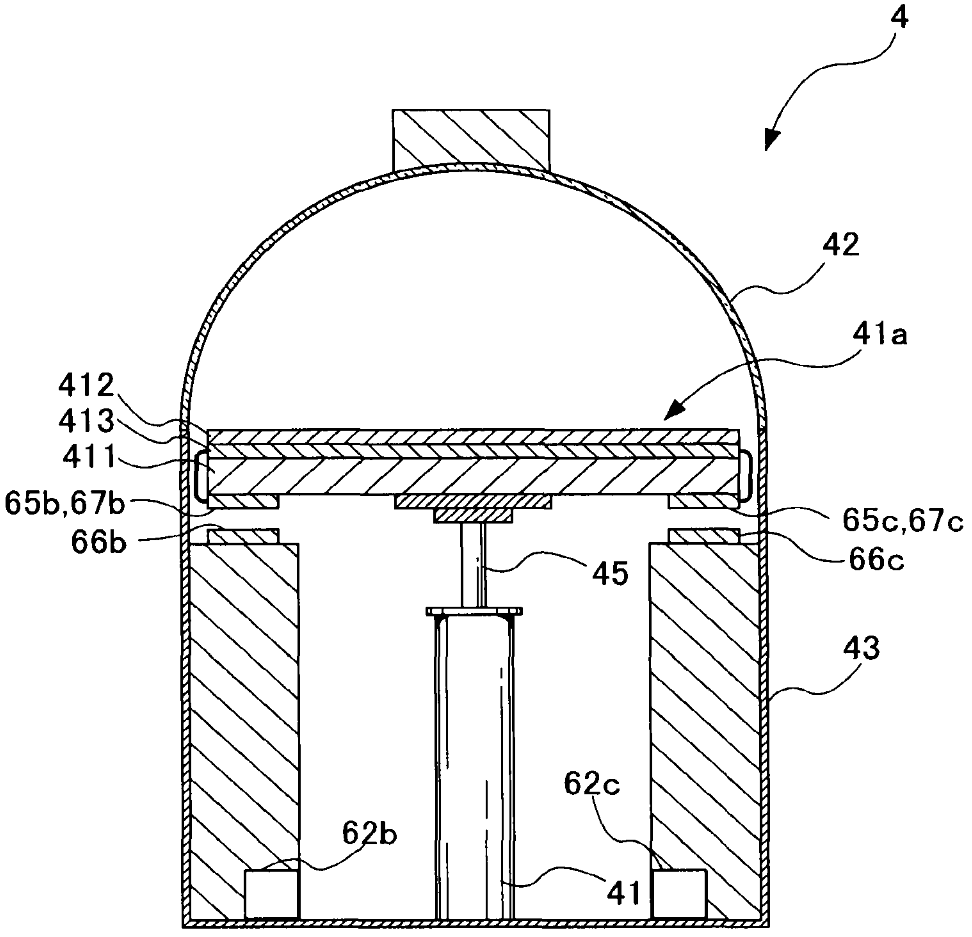
FIG. 4A is a diagram illustrating a cross-section A-A of FIG. 3.

A dice movable unit 4 is described with reference to FIGS. 1A, and 3A and 4A. FIG. 3A is a perspective diagram showing a dice movable unit 4. FIG. 4A is a diagram illustrating a cross-section A-A of a dice movable unit 4.

The dice movable unit 4 is configured so as to allow a plurality of the dice 40 to roll and stop. This dice movable unit 4 includes a shaking device 41 that is configured so as to allow the dice 40 to roll, a cover member 42 that covers an upper side of the shaking device 41 and is formed in a dome shape, and a unit main body 43 that houses the shaking device 41. In the present embodiment, the shaking device 41 rolls the three dice 40 (the die 40*a*, the die 40*b*, and the die 40*c*).

The cover member 42 is disposed so as to cover the overall top face of the playing board 41*a*. Furthermore, the cover member 42 is made of a transparent member in a substantially hemispherical shape and limits an area in which the dice 40 roll.

A plurality of the dice 40 is disposed at a space formed by the playing board 41*a* and the cover member 42. In the present embodiment, the dice 40 are substantially hexahedral and the IC tags are embedded in each face thereof. It should be noted that this wireless IC tag 401 is embedded in the surface of the dice 40 so as not to be visually recognized from the outside of the dice 40. For example, the dice 40 can be formed by disposing the wireless IC tag 401 at the surface of a member as a base of the dice 40 and then placing a member as a cover thereover.

The dice movable unit 4 includes lamps 44. The lamps 44 perform various rendered effects by emitting lights while the dice 40 are being rolled.

The shaking device 41 is formed in a substantially circular shape as viewed in a plane, supports a plurality of the dice 40, and includes the playing board 41*a* as a field in which a plurality of the dice 40 are rolled and a cylinder portion 45 that oscillates the playing board 41*a* vertically.

Since the playing board 41*a* is formed to be substantially planar, as shown in FIG. 4A, the dice 40 are rolled by oscillating the playing board 41*a* substantially in the vertical direction with respect to the horizontal direction of the playing board 41*a* by way of the cylinder portion 45 that supports the playing board 41*a* from a bottom face side of the playing board 41*a*. Then, when the oscillation of the playing board 41*a* comes to rest, the dice 40 rolling comes to rest.

Furthermore, the playing board 41*a* includes a playing board main body 411, a cushion member 412 that is disposed on the upper surface of the playing board main body 411, and an antenna base portion 413 that is disposed between the playing board main body 411 and the cushion member 412 and in which the antennas 63*a*, 63*b*, and 63*c* are disposed. It is preferable that members forming these are made of a non-metallic member. Since radio waves are susceptible to the interference of metal, if metal exists near the wireless IC tag 401, the communication range between the reader 62 and the wireless IC tag 401 is reduced, and thus it may prevent the wireless IC tag 401 from being read by the reader 62.

Then, the antennas 63*a*, 63*b*, and 63*c*, which are disposed at the antenna base portion 413, are connected to the first communication portion 65*a*, 65*b*, and 65*c* via a wire, respectively. The first communication portions 65*a*, 65*b*, and 65*c* are disposed respectively at the bottom face side of the playing board main body 411. Furthermore, the second communication portion 66 is disposed so as to face the first communication portions 65*a*, 65*b*, and 65*c*. The second communication portions 66*a*, 66*b*, and 66*c* are disposed on a side of the unit main body 43 of the dice movable unit 4. That is, the first communication portion 65 and the second communication portion 66 are disposed respectively at a side of the bottom face side of the playing board 41*a* so as to face each other. Thus, even in a case in which the playing board 41*a* moves along with the vertical movement of the cylinder portion 45, the positions of the first communication portion 65 and the second communication portion 66 are not dislocated, which can maintain a stable communication status. In a case in which the first communication portion 65 and the second communication portion 66 are disposed on a side face of the playing board 41*a*, it may cause a case in which the first communication portion 65 and the second communication portion 66 are not located so as to face each other after the movement of the playing board 41*a*, which may interrupt the communication therebetween. By disposing the first communication portion 65 and the second communication portion 66 so as to face each other at a side of the bottom face of the playing board 41*a*, it is possible to prevent such a situation.

Then, the reader 62 transmits the information received from the antenna 63 and stored in the wireless IC tag 401 to the controller 2. At this time, in the wireless IC tag 401, information stored in the memory is encoded (source coding) and further encoded for complying with a transmission channel (transmission coding). Then, upon transmitting the information to the reader 62, the wireless IC tag 401 transmits by modulating into an analogue waveform. The reader 62 demodulates the data thus modulated and returns it to a digital waveform, and further decodes it to the original state and transmits information to the controller 2.

Die

Figure 5A:
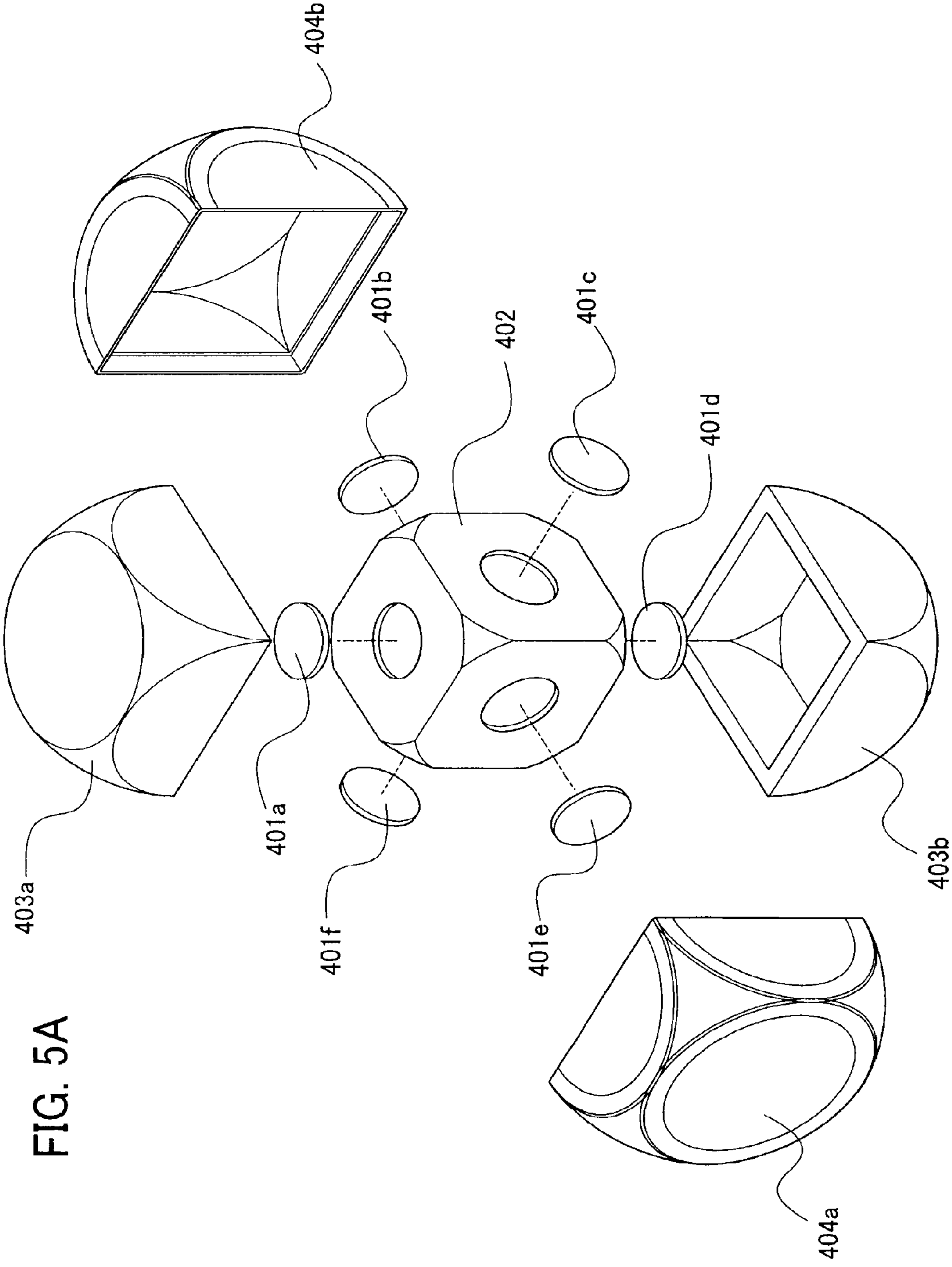
FIG. 5A is a exploded perspective view of a die according to a third embodiment of the present invention.

A die 40 is described with reference to FIG. 5A. FIG. 5A is an exploded perspective view of a die 40.

A die 40 is composed of a core portion 402, an intermediate portion 403, and a covering portion 404, and the wireless IC tag 401 is disposed between the core portion 402 and the intermediate portion 403. This wireless IC tag 401 is disposed in each face of 6 faces of the die 40.

The core portion 402 is a substantially cubic member which is formed by cutting off corners of the cube. At the substantially central portions of each of the faces of the core portion 402, concave portions are formed in order to embed the wireless IC tags 401, and the wireless IC tags 401*a*, 401*b*, 401*c*, 401*d*, 401*e*, and 401*f* are disposed at each of the six concave portions.

The intermediate portion 403 is configured by combining a first intermediate portion 403*a* with a second intermediate portion 403*b* which are larger than the core portion 402 and are formed by dividing a substantially cubic body in half. The first intermediate portion 403*a* and the second intermediate portion 403*b* have concave portions formed on the insides thereof that each fit half of the core portion 402. Then, for example, by covering the core portion 402 on which the wireless IC tags 401 are embedded, by the first intermediate portion 403*a* from above and the second intermediate portion 403*b* from below, the core portion 402 is covered by the intermediate portion 403.

The covering portion 404 is configured by combining a first external portion 404*a* and a second external portion 404*b* which are slightly larger than the intermediate portion 402 and are formed by dividing a substantially cubic body in half. The first covering portion 404*a* and the second covering portion 404*b* have concave portions formed on the insides thereof that each fit half of the intermediate portion 403. For example, by covering the intermediate portion 403 by the first covering portion 404*a* from left and the second covering portion 404*b* from right, the intermediate portion 403 is covered by the covering portion 404.

It should be noted that it is possible to apply a film-type tag as the wireless IC tag. In this case, it is not necessary to form concave portions in the core portion 402, and it is possible to mount by attaching directly on the core portion 402. On the other hand, in order to reduce flexure of the wireless IC tag in the dice 40, it is particularly preferable that a hard plastic member such as ABS resin is applied to the covering portion 404.

The wireless IC tag 401 can appropriately employ an active tag which embeds a battery, a passive tag operated using electric power transferred from a reader/writer, and a semi-passive tag using electric power of a battery for a sensor operation. Furthermore, appropriate combinations for the wireless IC tag 401 as a reader can be employed. In the present embodiment, a passive tag is employed. In addition, reading the wireless IC tags may not only be done by the non-contact type, but also a contact type.

In addition, the reader is not limited thereto, and anything that is appropriately designed with the object of being read may be employed.

Here, in the present embodiment, the number of dots of a face, opposing the face on which the wireless IC tag 401 is embedded, is determined as the number of dots of the dice 40.

More specifically, "one" is stored as data of the number of dots in the wireless IC tag 401 on the face of which the number of dots is "six". "Two" is stored as data of the number of dots in the wireless IC tag 401 on the face of which the number of dots is "five". "Six" is stored as data of the number of dots in the wireless IC tag 401 on the face of which the number of dots is "one". "Five" is stored as data of the number of dots in the wireless IC tag 401 on the face of which the number of dots is "two". "Three" is stored as data of the number of dots in the wireless IC tag 401 on the face of which the number of dots is "four". Finally, "four" is stored as data of the number of dots in the wireless IC tag 401 on the face of which the number of dots is "three".

Then, in a state in which the dice 40 are stopped, the reader 62 reads the wireless IC tag 401 on a face that is in contact with the playing board 41*a* (in other words, a face facing toward the lower side of the dice 40). Then, since data of a number of dots for a face opposite to the face is stored in the wireless IC tag 401 of the face thus read, the face facing the upper side when the dice 40 come to rest is recognized as a number of dots being appeared.

For example, in the dice 40, in a case in which a face that is in contact with the playing board 41*a* is a face of which number of dots is "six", the reader 62 reads data of the IC tag 401 which is embedded in the face of "six". Data of the number of dots stored in the wireless IC tag 401 of the face "six" is "one", which is the number of dots on the face facing opposing the face of "six", the number of dots on the dice 40 is recognized as "one".

Furthermore, the memory of the wireless IC tag 401 includes information of a color in which the dice 40 is made. For example, in a case in which the die 40*a* is made to be red, the memory of the wireless IC tag 401 that is embedded in the red die 40*a* includes information indicating that the color is "red".

Controller

Figure 6A:
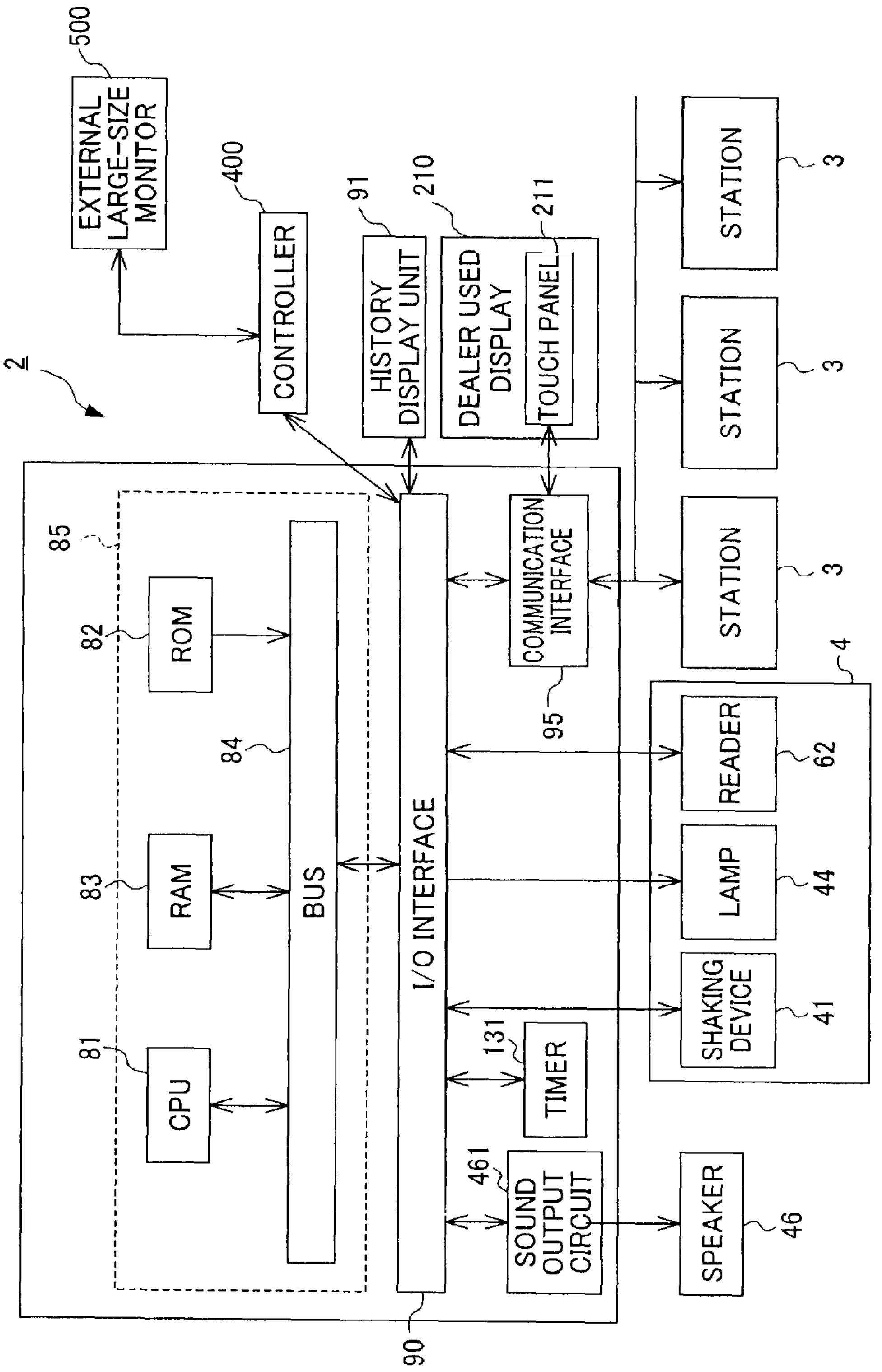
FIG. 6A is a block diagram showing an internal configuration of a controller according to a third embodiment of the present invention.

FIG. 6A is a block diagram showing an internal configuration of the controller 2.

The controller 2 perform control of the entire game and transmits to the reader 62 of the dice movable unit 4 an instruction signal for supplying electric power to the antennas 63*a*, 63*b*, and 63*c*.

The controller 2 of the gaming machine 1 includes a microcomputer 85, which is mainly configured with a CPU 81, ROM 82, RAM 83, and a bus 84 that transfers data therebetween.

The CPU 81 is connected with a shaking device 41 via an I/O interface 90. Furthermore, the CPU 81 is connected with a timer 131, which can measure time via the I/O interface 90. In addition, the CPU 81 is connected with a lamp 44. The lamp 44 emits various colors of light for performing various types of rendered effects, based on output signals from the CPU 81. Furthermore, the CPU 81 is connected with a speaker 46 via a sound output circuit 461. The speaker 46 emits various sound effects for performing various types of rendered effects, based on output signals from the sound output circuit 461.

Furthermore, the I/O interface 90 is connected with the reader 62, thereby transmitting and receiving information in relation to the number of dots of the three dice 40, which comes to rest on the playing board 41*a*, between the reader 62. In addition, via a communication interface 95 connected to the I/O interface 90, the controller 2 transmits and receives data such as bet information, payout information, and the like to and from each station 3, as well as data such as bet start instruction images, bet start instruction signals, and the like to and from the dealer used display 210.

ROM 82 in the controller 2 is configured to store a program for implementing basic functions of the gaming machine 1; more specifically, a program for controlling various devices which drive the dice movable unit 4, a program for controlling each station 3, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 3, information on respective number of dots that appear on the dice 40 transmitted from the reader 62, data relating to the results of processing executed by CPU 81, and the like.

A jackpot storage area is provided in the RAM 83. In the jackpot storage area, the data indicating the number of playing media stored cumulatively is stored so as to correspond to each number of dots of matching dice. The data is provided to the station 3 at a predetermined timing, and a jackpot image is displayed.

The CPU 81 control the shaking device 41 of the dice movable unit 4 based on data or a program stored in the ROM 82 or the RAM 83 and oscillates the playing board 41*a* (a shaking motion) of the dice movable unit 4. Furthermore, after the shaking motion of the playing board 41*a* ceases, a control processing associated with game progression, such as confirmation processing for confirming the number of dots on each of the dice 40 resting on the playing board 41*a* is executed.

Furthermore, the I/O interface 90 is connected with a history display unit 91, and the controller 2 transmits and receives information in relation to the number of dots on the die as game history, to and from the history display unit 91.

Furthermore, an external large-size monitor is connected to the I/O interface 90 through the controller 400, and the controller 2 transmits and receives image data and the like to/from the external large-size monitor 500.

On the external large-monitor 500, a game advancement, a game result, a live image of dice rolling, a demonstration screen, and the like are displayed. This attracts interest of people around the external large-size monitor 500.

In addition to the control processing described above, the CPU 81 has a function of executing a game by transmitting and receiving data to and from each station 3 so as to control each station 3. More specifically, the CPU 81 accepts bet information transmitted from each station 3. Furthermore, the CPU 81 performs win determination processing based on the number of dots on the dice 40 and the bet information transmitted from each station 3, and calculates the amount of an award paid out in each station 3 with reference to the payout table stored in the ROM 82.

Modified Examples

Modified examples of the third embodiment are described with reference to FIGS. 7A to 10A. The following modified examples configure a detection device 61 in which the shape of the antennas 63 which are disposed at the antenna base portion 413 is varied. In the following, parts different from those of the third embodiment are mainly explained, and explanations of parts that are the same as in the third embodiment are omitted. It should be noted that the same numerals are used in a case in which parts thereof are the same as in the third embodiment.

First Modified Example

Figure 7A:
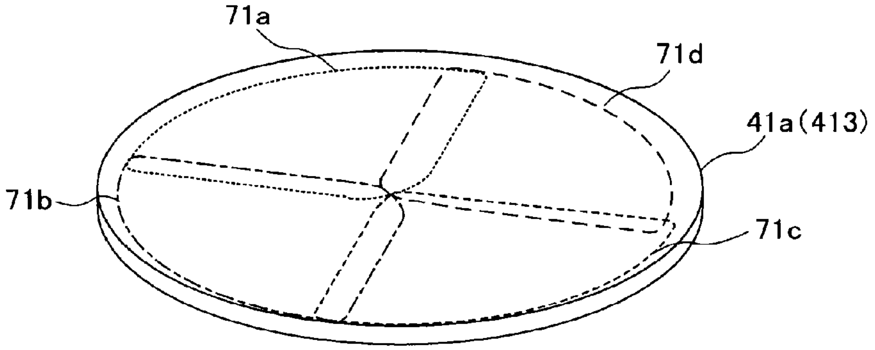
FIG. 7A is a schematic representation of an antenna of a playing board according to a first modified example of the present invention.

A first modified example is described with reference to FIGS. 7A and 8A. FIG. 7A is a perspective view of a playing board 41*a* at which antennas 71*a*, 71*b*, 71*c*, and 71*d* in the first modified example are disposed. FIG. 8A is a configuration diagram of a detection device 61 in the first modified example.

Four antennas 71 in the detection device 61 of the first modified example are provided. These four antennas 71*a*, 71*b*, 71*c*, and 71*d* are each formed in a loop-shape of a substantial quarter circle, and a portion of the one antenna 71 is disposed so as to be superimposed with a portion of the other antenna 71.

In addition, four first communication portions 65, four second communication portions 66, and four readers are respectively provided to correspond to the number of the antennas 71. Then, the four readers 62*a*, 62*b*, 62*c*, and 62*d* are connected with the controller 2, respectively.

Second Modified Example

Figure 9A:
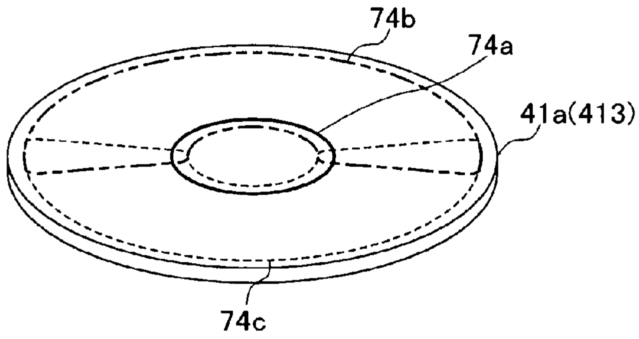
FIG. 9A is a schematic representation of an antenna of a playing board according to a first modified example of the present invention.

The second modified example is described with reference to FIGS. 9A and 10A. FIG. 9A is a perspective view of a playing board 41*a* at which antennas 74*a*, 74*b*, and 74*c* in the second modified example are disposed. FIG. 10A is a configuration diagram of a detection device 61 in the second modified example.

Three antennas 74 in the detection device 61 of the third modified example are provided. Among these three antennas 74*a*, 74*b*, and 74*c*, the antenna 74*a* is disposed substantially at the center of the playing board 41*a* as a field on which the dice 40 roll, and is formed to be a loop-shape of substantial circular shape. Regarding the antennas 74*b* and 74*c*, each of the shapes is formed in a loop-shape which forms a shape in which two concentric semicircles are tied together by a straight line (a so-called semi-circular doughnut shape). Then, the antennas 74*b* and 74*c* are disposed so that bottom side portions of the semicircles thereof face each other and portions of the areas formed by being enclosed with the antenna 74*b* or 74*c* are mutually superimposed.

Fourth Embodiment

A Fourth embodiment is described with reference to FIGS. 11A and 12A. The Fourth embodiment is different from the third embodiment in regard to a location where an antenna is disposed and a shape thereof. In the following, parts different from those of the third embodiment are mainly explained, and explanations of parts that are the same as in the third embodiment are omitted. It should be noted that the same numerals are used in a case in which parts thereof are the same as in the third embodiment.

Figure 11A:
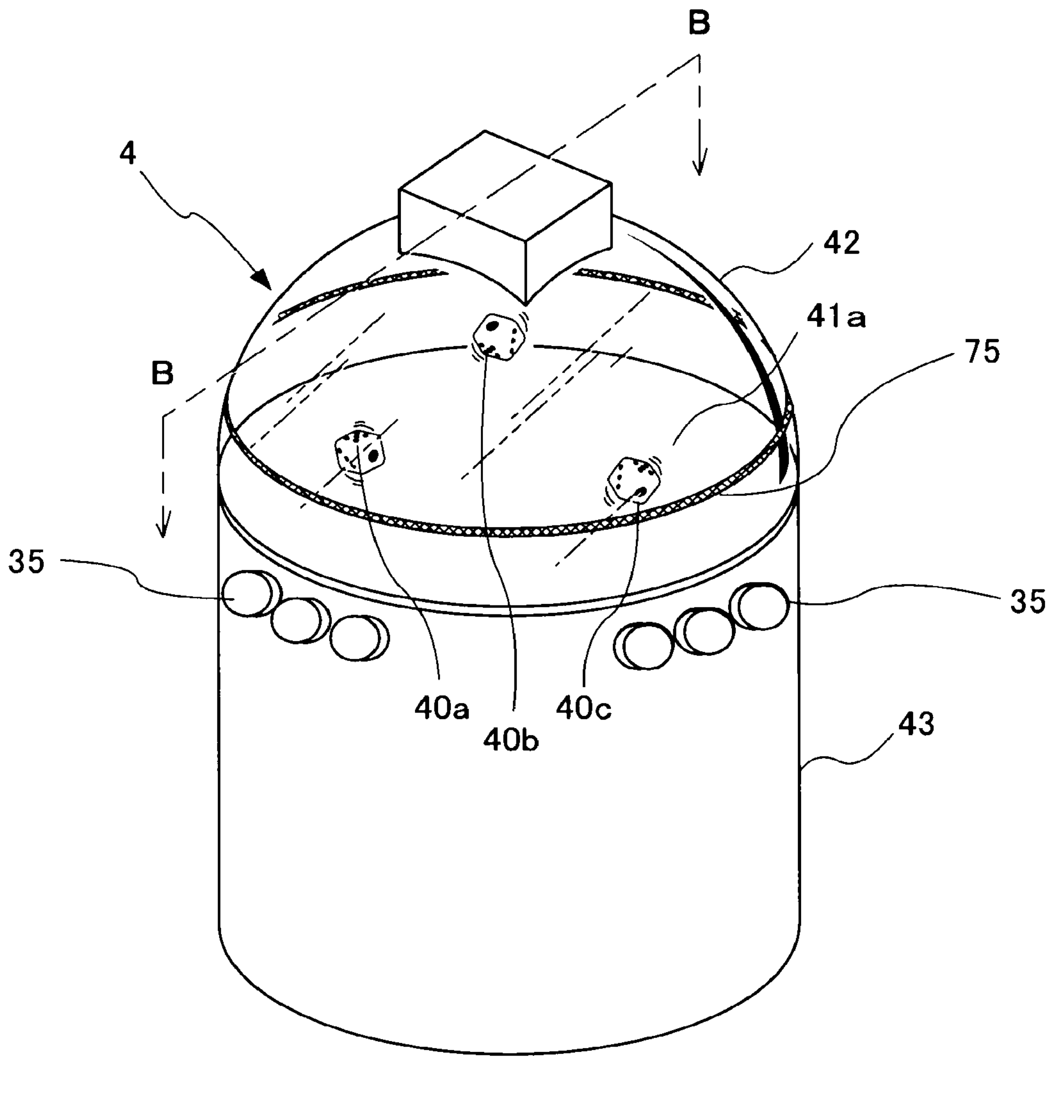
FIG. 11A is a perspective view showing a dice movable unit according to a fourth embodiment of the present invention.
Figure 12A:
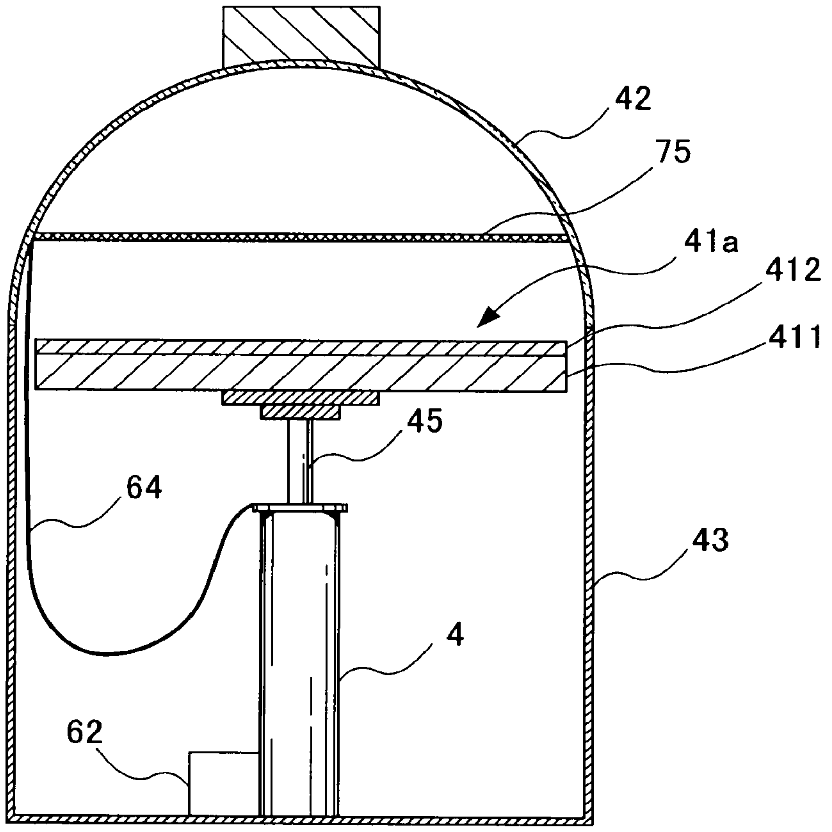
FIG. 12A is a diagram illustrating a cross-section B-B of a dice movable unit according to a fourth embodiment.

FIG. 11A is a perspective view of a dice movable unit 4 according to the fourth embodiment. FIG. 12A is a diagram illustrating a cross-section B-B of a dice movable unit 4 according to a fourth embodiment.

In the fourth embodiment, only an antenna 75 of the reader 62 is disposed at a cover member 42 that covers an upper side of the playing board 41*a*. In addition, the antenna 75 is formed in a loop-shape so as to follow an inner side of the cover member 42 at a predetermined distance from an upper face of the playing board 41*a*. A predetermined distance from the upper face of the playing board 41*a* depends on the size of the dice 40. In the present embodiment, the antenna 75 reads data stored in the wireless IC tag 401 that is disposed on a face facing an upper side in a state in which the die 40 comes to rest. Thus, the antenna 75 is disposed at a location where it can read a face of the die 40 facing the upper side.

The playing board 41*a* includes a playing board main body 411 and a cushion member 412 that is disposed on the surface of the playing board main body 411, without an antenna base portion 413, as in the third embodiment. Then, the first communication portion 65 is disposed at the bottom face side of the playing board main body 411.

According to the third embodiment, three antennas 63*a*, 63*b*, and 63*c* of the reader 62 are disposed in a loop-shape, respectively, in the playing board 41*a* as a field where the dice 40 having the wireless IC tags 401 on each face thereof roll. Since the portions of the areas formed by these three antennas 63*a*, 63*b*, and 63*c* are disposed so as to be mutually superimposed, the numbers of dots on the dice 40 can be detected regardless of position on the playing board 41*a*.

According to the third embodiment, the reader 62 that has received an instruction signal from the controller 2 supplies electric power to each of the three antennas 63*a*, 63*b*, and 63*c* in a predetermined order according to the instruction signal. Thus, the antenna 63 detects the dice 40 one by one in sequence. In this way, it is possible to prevent interference caused by simultaneous detection.

According to the abovementioned embodiment, the first communication portion 65 and the second communication portion 66 are provided that perform wireless communication between the reader 62 and the antenna 63. Thus, since it is possible to omit a member such as a wire that moves along with the movement of the moving part such as the playing board 41*a* and the cylinder portion 45, it is possible to prevent deterioration of a member due to the movement of the moving part. In addition, by preventing deterioration, it is possible to reduce the frequency of maintenance and increase operation availability.

While an embodiment of the gaming machine according to the present invention has been described, it is to be understood that the above description is intended to be illustrative, and not restrictive, and any changes in design may be made to specific configurations such as various means. Moreover, it should be understood that the advantages described in association with the embodiments are merely a listing of most preferred advantages, and that the advantages of the present invention are by no means restricted to those described in connection with the embodiments.

According to the third embodiment, although the wireless IC tag 401 is a passive tag, the present invention is not limited thereto, and for example, an active tag may be employed. In addition, although electromagnetic induction is employed as a communication mode, the present invention is not limited thereto, and radio waves may be employed.

What is claimed is:

1. A device for detecting a number of dots on a die of a gaming machine, the device comprising:
- a wireless tag that is disposed in the die;
- a reading device that reads information about the number of dots on the die from the wireless tag; and
- a display that displays the read information,
- wherein the reading device includes a plurality of antennas that are disposed on a field on which the die rolls, and
- wherein the plurality of antennas include a first antenna and a second antenna that is partially superimposed with the first antenna and is moved to be dislocated to a predetermined direction from a position where the first antenna is located.

2. The device of claim 1, wherein each of the plurality of antennas is formed in a grid pattern.

3. The device of claim 2, wherein the predetermined direction is a direction that is parallel to a grid line of the lattice grid pattern.

4. The device of claim 3, wherein the second antenna is moved by a length of a half grid in the lattice grid pattern from the position where the first antenna is located.

5. The device of claim 3, wherein the plurality of antennas further include a third antenna that is partially superimposed with the first antenna and is moved to be dislocated to a second direction from the position where the first antenna is located, and
- wherein the second direction is a direction that is perpendicular to the predetermined direction.

6. The device of claim 5, wherein the third antenna is moved by the length of the half grid in the lattice grid pattern from the position where the first antenna is located.

7. The device of claim 3, wherein the plurality of antennas further include a third antenna that is partially superimposed with the first antenna and is moved to be dislocated to a second direction from the position where the first antenna is located, and wherein the second direction is a direction that is parallel to a diagonal of a single grid in the lattice grid pattern.

8. The device of claim 7, wherein the second antenna is moved by half of a length of the diagonal from the position where the first antenna is located.

9. The device of claim 2, wherein the predetermined direction is a direction that is parallel to a diagonal of a single grid in the lattice grid pattern.

10. The device of claim 9, wherein the second antenna is moved by half of a length of the diagonal from the position where the first antenna is located.

11. A device for detecting a number of dots on a die of a gaming machine, the device comprising:

a field that supports the die having a wireless tag;

a reading device that reads the number of dots information of the die from the wireless tag; and a display that displays the read information, wherein the reading device includes a reader main body portion that decodes the number of dots information from the wireless tag and controls the reader, and a plurality of antenna that are connected to the reader main body portion, and wherein the plurality of antennas include a first antenna and a second antenna that is partially superimposed with the first antenna and is moved to be dislocated to a predetermined direction from a position where the first antenna is located.

12. The device of claim 11, wherein each of the plurality of antennas is formed in a grid pattern.

13. The device of claim 12, wherein the predetermined direction is a direction that is parallel to a grid line of the lattice grid pattern.

14. The device of claim 13, wherein the second antenna is moved by a length of a half grid in the lattice grid pattern from the position where the first antenna is located.

15. The device of claim 13, wherein the plurality of antennas further include a third antenna that is partially superimposed with the first antenna and is moved to be dislocated to a second direction from the position where the first antenna is located, and wherein the second direction is a direction that is perpendicular to the predetermined direction.

16. The device of claim 15, wherein the third antenna is moved by the length of the half grid in the lattice grid pattern from the position where the first antenna is located.

17. The device of claim 13, wherein the plurality of antennas further include a third antenna that is partially superimposed with the first antenna and is moved to be dislocated to a second direction from the position where the first antenna is located, and wherein the second direction is a direction that is parallel to a diagonal of a single grid in the lattice grid pattern.

18. The device of claim 17, wherein the second antenna is moved by half of a length of the diagonal from the position where the first antenna is located.

19. The device of claim 12, wherein the predetermined direction is a direction that is parallel to a diagonal of a single grid in the lattice grid pattern.

20. The device of claim 19, wherein the second antenna is moved by half of a length of the diagonal from the position where the first antenna is located.

* * * * *